US008010375B2

(12) United States Patent
Herter et al.

(10) Patent No.: US 8,010,375 B2
(45) Date of Patent: Aug. 30, 2011

(54) OBJECT MODEL FOR GLOBAL TRADE APPLICATIONS

(75) Inventors: Klaus Herter, Leimen (DE); Frauke Hoffmann, Hockenheim (DE); Bernd Kaemmerer, Wesel (DE)

(73) Assignee: SAP AG, Walldorf (DE)

( * ) Notice: Subject to any disclaimer, the term of this patent is extended or adjusted under 35 U.S.C. 154(b) by 1700 days.

(21) Appl. No.: 10/931,224

(22) Filed: Sep. 1, 2004

(65) Prior Publication Data

US 2005/0256798 A1 Nov. 17, 2005

Related U.S. Application Data

(60) Provisional application No. 60/569,603, filed on May 11, 2004.

(51) Int. Cl.
G06Q 10/00 (2006.01)
G06Q 30/00 (2006.01)
(52) U.S. Cl. ........................................ 705/1.1; 705/26.1
(58) Field of Classification Search ................ 705/1, 26, 705/27, 1.1, 26.1
See application file for complete search history.

(56) References Cited

U.S. PATENT DOCUMENTS

| 5,197,005 | A | * | 3/1993 | Shwartz et al. ........................ 1/1 |
| 6,745,388 | B1 | | 6/2004 | Gupta et al. |
| 6,892,185 | B1 | * | 5/2005 | Van Etten et al. ............. 705/26.8 |
| 7,133,882 | B1 | * | 11/2006 | Pringle et al. ...................... 707/5 |
| 7,272,509 | B1 | * | 9/2007 | Culot et al. ....................... 702/22 |
| 2002/0111885 | A1 | * | 8/2002 | Geiger et al. .................... 705/28 |
| 2002/0167458 | A1 | | 11/2002 | Baudisch et al. |
| 2002/0167460 | A1 | | 11/2002 | Baudisch et al. |
| 2003/0069689 | A1 | | 4/2003 | Ihara et al. |
| 2003/0122874 | A1 | | 7/2003 | Dieberger et al. |
| 2003/0163439 | A1 | | 8/2003 | Hankin et al. |
| 2003/0212640 | A1 | * | 11/2003 | Andresen et al. ................ 705/64 |
| 2003/0227471 | A1 | | 12/2003 | Eglit et al. |
| 2004/0093606 | A1 | * | 5/2004 | Ciornei et al. ................. 719/315 |
| 2004/0177361 | A1 | | 9/2004 | Bernhard et al. |
| 2004/0193506 | A1 | * | 9/2004 | Zmolek ........................... 705/27 |
| 2004/0223058 | A1 | | 11/2004 | Richter et al. |
| 2005/0182822 | A1 | | 8/2005 | Daniel et al. |
| 2005/0257197 | A1 | | 11/2005 | Herter et al. |
| 2006/0048062 | A1 | | 3/2006 | Adamson |
| 2006/0061516 | A1 | | 3/2006 | Campbell et al. |

OTHER PUBLICATIONS

Anon., "Softface and FullTilt Form Strategic Partnership to Leverage Technology in Product Information Management," Business Wire, p. 1, Aug. 27, 2002.*
"U.S. Appl. No. 10/931,225 response filed Nov. 6, 2008 to Non-Final Office Action mailed Aug. 6, 2008", 9 pgs.
"U.S. Appl. No. 10/931,225, Final Office Action mailed Jan. 9, 2008", 14 pgs.

(Continued)

*Primary Examiner* — Nicholas D Rosen
(74) *Attorney, Agent, or Firm* — Schwegman, Lundberg & Woessner, P.A.

(57) ABSTRACT

Data management systems are described for managing product data during global trade scenarios. Product objects are used within a system landscape of a business or other organization to refer to products traded by the organization. Each product object is related to, but de-coupled for the purposes of global trading from, one or more trade item objects, where the trade item objects include information related to specific global trade standards, trade scenarios, or trading partners. This model results in a "handshake model" in which in-house processing and operations are implemented using the product object(s), while global trade processing is implemented using the corresponding trade item object(s).

33 Claims, 15 Drawing Sheets

OTHER PUBLICATIONS

"U.S. Appl. No. 10/931,225, Non-Final Office Action mailed Jul. 27, 2007", 13 pgs.

"U.S. Appl. No. 10/931,225, Response filed Oct. 29, 2007 to Non-Final Office Action mailed Jul. 27, 2007", 8 pgs.

"U.S. Appl. No. 10/931,225, Response filed May 9, 2008 to Final Office Action mailed Jan. 9, 2008", 10 pgs.

"U.S. Appl. No. 10/931,225 Non-Final Office Action mailed Aug. 6, 2008", OARN, 13 pgs.

"Business Message Standard for Data Synchronization Data Model for Trade Item (Date Definition)", *EAN UCC System Version 1.3.*, (2003), 217 pgs.

Barkley, J., "Implementing role-based access control using object technology", *Symposium on Access Control Models and Technologies; 20*, [Online]. Retrieved from the Internet: <URL:http://www.acm.org>, (1996), 93-98.

U.S. Appl. No. 10/931,225, Final Office Action mailed Jan. 22, 2009, 14 pgs.

U.S. Appl. No. 10/931,225, Response filed Mar. 20, 2009 to Final Office Action mailed Jan. 22, 2009, 11 pgs.

U.S. Appl. No. 10/931,225, Non-Final Office Action mailed Jul. 9, 2009., 14 Pgs.

"U.S. Appl. No. 10/931,225 , Final Office Action mailed Jan. 14, 2010", 14 Pgs.

"U.S. Appl. No. 10/931,225, Advisory Action mailed Apr. 2, 2009", 3 pgs.

"U.S. Appl. No. 10/931,225, Response filed Oct. 8, 2009 to Non Final Office Action mailed Jul. 9, 2009", 9 pgs.

* cited by examiner

OBJECT MODEL FOR GLOBAL TRADE APPLICATIONS

CLAIM OF PRIORITY

This application claims priority under 35 USC §119(e) to U.S. Patent Application Ser. No. 60/569,603, filed on May 11, 2004, and titled "OBJECT IMPLEMENTATION MODEL FOR GLOBAL TRADE APPLICATIONS."

TECHNICAL FIELD

This description relates to data management and synchronization.

BACKGROUND

Global trade may be facilitated by synchronizing data and data exchange techniques between trading partners. For example, if a manufacturer produces a product that is to be purchased by a number of wholesalers, who, in turn, each provide the product to a number of retailers, then it is advantageous if all parties involved refer to the product by a common name, reference, or other designator. Similarly, if an enterprise seeks to assemble a product from a number of component parts, and the component parts are delivered by various suppliers, it is advantageous if the enterprise and the suppliers all have a common designator for the component parts and/or the product itself.

One technique for achieving such a common identifier is known as the Uniform Product Code (UPC), which is often represented by a bar code or number that is attached to a product, or type of product, that is for sale. Another technique involves the European Article Number(ing), Uniform Code Council (EAN.UCC) standard, which, similarly to the UPC, represents a voluntary standard used by organizations to refer to business products and/or processes.

SUMMARY

According to one general aspect, a system includes a product aggregator that is operable to receive product objects, the product objects including a product object that represents an abstraction of a product used in trading and that includes product attributes characterizing the product, and a trade item modifier that is operable to receive the product object and the product attributes, and is further operable to derive a trade item object therefrom for use in the trading of the product by defining trade item attributes that are determined based on the product attributes and on trading requirements of an application of a trading partner.

Implementations may include one or more of the following features. For example, a trading interface may be included for interfacing between the trade item and the application, independently of any communication between the application and the product object. The trade item modifier may derive the trade item object from the product object, based on a trading standard that is associated with the trading partner, and the trading standard may include the EAN.UCC standard.

The product object may be used internally within a system landscape of a user of the system to refer to the product, and the trade item object may be used to communicate regarding the product with the trading partner or others that are external to the system landscape. The product aggregator may be further operable to receive a plurality of related product objects related to the product, and to correct any inconsistencies between the plurality of related product objects to obtain the product object.

The system may include a product modifier that is operable to modify the product object, independently of the trade item object. The product modifier may be operable to modify the product attributes, without automatically affecting the trade item attributes.

The trade item modifier may be operable to modify the trade item object, independently of the product object. In this case, The trade item modifier may be operable to modify the trade item attributes, without automatically affecting the product attributes.

The system may include a relationship manager that is operable to manage relationships between the product object and the trade item object, based on shared attributes between the two. In this case, the relationship manager may be further operable to check a synchronization of values of the shared attributes, and to initiation a workflow to determine a need for the synchronization when the values are different from one another.

Multiple versions of the trade item object may be created, based on groupings or differing values of the trade item attributes. In the latter case, the differing values of the trade item attributes may be dependent on a relationship of the trade item object to the trading partner, or on a relationship of the trade item to a target market in which the product is to be sold.

The system may include a trade item packaging hierarchy system that is operable to define a packaging hierarchy according to which the product is grouped with other products for sale, shipment, or display.

The system may include a master data management system that is operable to provide an object model that includes the product objects and the trade item objects and that enables a common use of the product objects within a system landscape of a user of the master data management system. In this case, the master data management system may include a content consolidator that is operable to consolidate product objects uploaded from systems or applications within the system landscape, and a harmonizer that is operable to ensure consistency of data within the product objects or the trade item objects, throughout the systems or applications.

According to another general aspect, a product object is received that represents an abstraction of a product for sale, the product object including product attributes. A trade standard governing information exchanges with a trading partner is accessed, and a trade item object is derived from the product attribute, based on the trade standard and an application used by the trading partner.

Implementations may include one or more of the following features. For example, the product object may be used to reference the product throughout an internal system landscape, and the trade item object may be used to reference the product in communication with the application and external to the system landscape.

Access to the trade item may be provided by the application, independently of a communication between the product object and the application. Deriving the trade item object may include determining trade item attributes from the product object attributes, for inclusion within the trade item object. In this case, multiple versions of the trade item object may be created, based on groupings or values of the attributes, or based on relationships between the trade item object and the trading partner, or on relationships between the trade item object and a target market of the product. Values of the product object attributes may be validated against values of shared trade item attributes.

Receiving the product object may include receiving a plurality of product objects related to the product, and consolidating the product objects into the product object. The product object and the trade item object may be modified independently of one another. Deriving the trade item object may include creating a packaging hierarchy that defines the trade item in terms of a packaging of the product for sale, shipment, or delivery.

According to another general aspect, an apparatus includes a storage medium having instructions stored thereon, and the instructions include a first code segment for maintaining a plurality of product objects representing abstractions of products for sale, including a product object having product attributes characterizing a product, a second code segment for maintaining a plurality of trade item objects derived from the product objects based on a trading standard, including a trade item object having trade item attributes derived from the product attributes, and a third code segment for maintaining the product objects and the trade item objects such that use of the product object within an internal system landscape of an organization is independent of use of the trade item object externally of the system landscape.

Implementations may include one or more of the following features. For example, a fourth code segment may be included for using the trade item object externally of the system landscape by interfacing with an application of a trading partner through the trade item object. In this case, the second code segment may include a fifth code segment for deriving the trade item attributes from the product attributes, based on requirements of the application. A fourth code segment may be included for validating the trade item attributes against the product object attributes.

The details of one or more implementations are set forth in the accompanying drawings and the description below. Other features will be apparent from the description and drawings, and from the claims.

DETAILED DESCRIPTION

Figure 1:
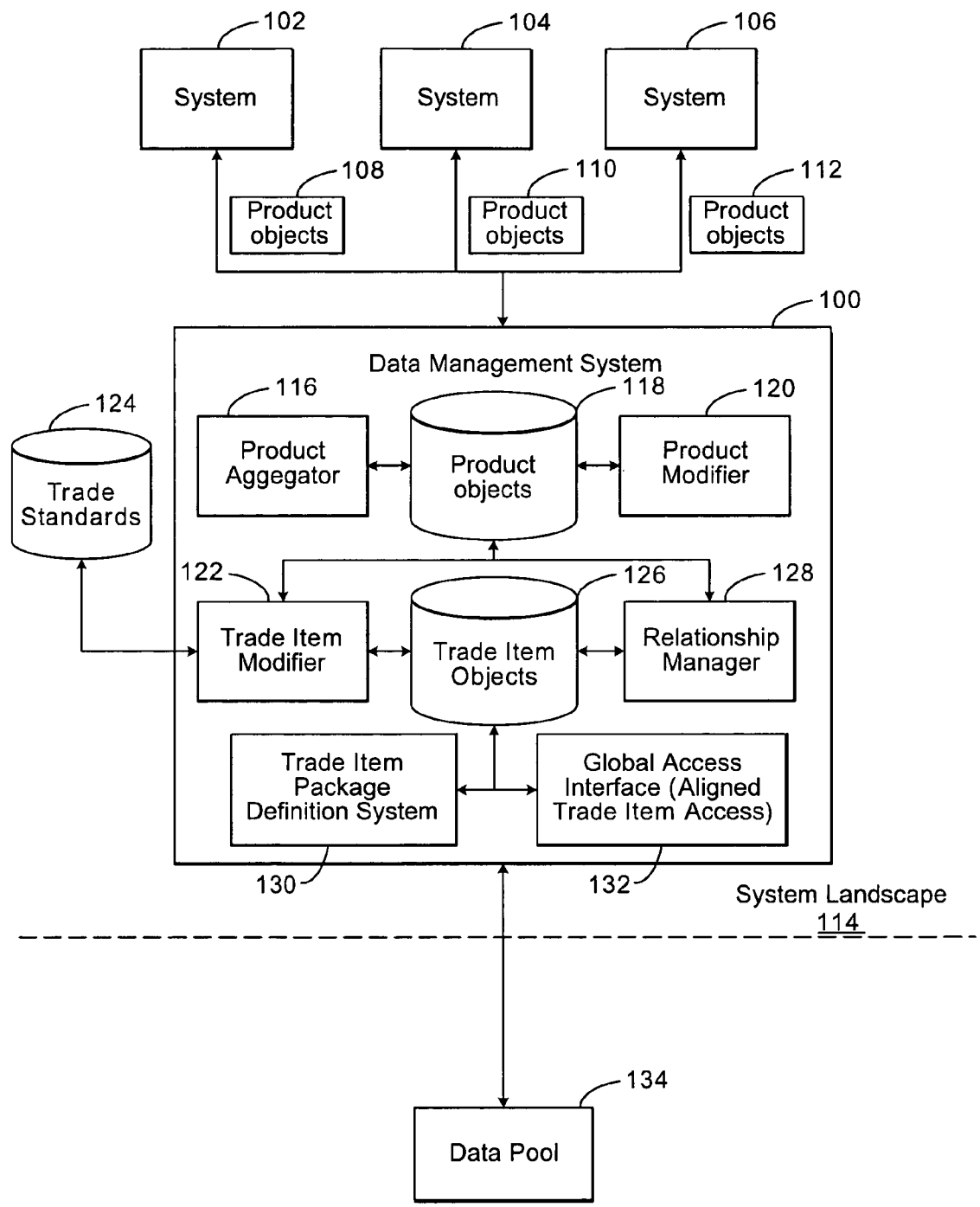
FIG. 1 is a block diagram of a data management system.

FIG. 1 is a block diagram of a data management system 100. The data management system 100 may represent, for example, a system that is run by a business enterprise, or by some other entity or organization.

The data management system 100 is connected to a first system 102, a second system 104, and a third system 106. Thus, for example, within the context of a business enterprise, the systems 102, 104, and 106 may represent different systems used by organizational units, subsidiaries, or other divisions or affiliates of the business enterprise.

The systems 102, 104, and 106 are generally involved in achieving the goals of the business enterprise. For example, if the business enterprise is a manufacturer that produces several types of products, then the system 102 may represent a system used to order component parts, while the system 104 may be a system used in assembling the parts, and the system 106 may be a system for distributing the parts to customers. Of course, the business enterprise may be virtually any type of business enterprise besides a manufacturer, or may be any other type of enterprise or organization, and the systems may represent many other types of systems than those just mentioned.

In addition to serving different purposes within the context of an enterprise, the systems 102, 104, and 106 may have various other differences from one another. For example, they may run on different software platforms, or they may operate according to different programming languages or software protocols than one another, or than the data management system 100. Also, differences between the systems 102, 104, and 106 (and therefore decreased compatibility) may occur due to the fact that the systems 102, 104, and 106 are operated by different human users. In particular, one or more of the systems 102, 104, or 106 may have previously belonged to a separate business entity that was joined with the business enterprise due to a merger or acquisition, and may have numerous differences in operating procedures.

In FIG. 1, each of the systems 102, 104, and 106 produce product objects 108, 110, and 112, respectively. In this context, the term objects generally refers to self-contained, discrete software entities that include both data and/or methods to manipulate the data. Such software entities may correspond to one or more real-world entities, such as, for example, a person or group of persons, a business or organizational unit of a business, or a class of persons (e.g., customers, suppliers, manufacturers, or business partners).

Here, the product objects 108, 110, and 112 generally refer to one or more products being produced by the business enterprise. Thus, the product object represents an abstract description of a subject of business activity. As such, it may have a unique product identifier (ID) and may be, for example, a material, a service, a financing, a warranty or a piece of intellectual property. When the product objects 108, 110, and 112 represents materials, such materials may refer to, for example, any goods that are the subject of business activity, and that may be traded, used in manufacture, consumed, or produced.

Due to the differences in the systems 102, 104, and 106, as referred to above, the product objects 108, 110, and 112 that are output by those systems may be different from one another, even when the products objects 108, 110, and/or 112 ostensibly refer to the same real-world product. For example, as a product is developed over time from conceptualization, to development, to construction, to marketing, to actual sale, the product may naturally be modified to a greater or lesser extent. As a result, a corresponding product object may be modified over time, and/or may be modified by different departments at the same (or overlapping) times.

As one example, a development unit may be using the system 104 to update a version of a product (and corresponding product object(s) 110), while a marketing unit may be using the system 106 to describe the previous version of the product (and corresponding object(s) 112). Similarly, even if a product is the same within different ones of the systems 102, 104, and 106, it may be the case that different descriptions (and therefore different product objects) may be necessary for different end users of the product. In particular, different product objects may be required for different retail sellers of the product, or for different customers who might buy the product.

Moreover, if information about the product is to be exchanged through the use of pre-defined trade standards, such as, for example, the EAN.UCC standard referred to above, then the various differences in the product(s) and the corresponding product object(s) must be taken into account when conforming the product information to the trade standard. In particular, the product information should be synchronized within a system landscape 114 of the business enterprise that include the systems 102, 104, and 106 (and perhaps other systems, not shown), as well as the data management system 100. Further, the product information should be current and timely within the system landscape 114 (e.g., should reflect any recent changes or modifications to the product).

Accordingly, the data management system 100 includes a product aggregator 116 that receives the various product objects 108, 110, and 112, and ensures that the data within the product objects is synchronized. For example, if the product aggregator receives the product object 108 with a partial description of a product from the system 102, and receives the product object 110 from the system 104, then the product aggregator 116 may correctly combine information from the two product objects 108 and 110 to obtain a completed product object for storing in a product objects database 118.

It should be understood from the above description that updates or modifications to product objects that are originated at one or more of the systems 102 or 104 may be reflected within the products objects database 118, but may not be reflected in one or more of the non-originating system(s) 106. For example, the system 106 may be used during follow-on processes related to the preceding operations of the systems 102 and/or 104 (e.g., packaging an assembled product). As a result, techniques may be used to update the product objects within the various systems 102, 104, and 106, in order to ensure that the product objects stored at those systems, if any, are synchronized with the contents of the product objects database 118, and thereby with corresponding product objects throughout the system landscape 114.

For example, in some implementations, it may be the case that all product objects are updated throughout the systems landscape 114 whenever the contents of the product objects database 118 are modified. For many systems, however, this implementation may require an impractical number or frequency of modifications, or may otherwise not be feasible. As a result, in other implementations, the data management system 100 may periodically update the product objects at predetermined intervals. As another example, one or more of the systems 102, 104, and 106 may periodically request an update of its local product objects. Techniques for synchronizing the product objects are discussed in more detail below.

The product objects within the product objects database 118 also may be modified within the data management system 100 itself, using, for example, a product modifier 120. Changes made using the product modifier 120, as should be apparent from FIG. 1, may easily be propagated throughout the system landscape 114.

As referred to above, product information should generally be shared and synchronized not only within and throughout the system landscape 114, but, particularly in global trade scenarios, should be shared and synchronized with trade partners outside of the system landscape 114, as well. As described in more detail below, such external synchronization may be achieved through the use of "trade item" objects.

The term "trade item" may generally be used to mean any product or service upon which there is a need to retrieve pre-defined information, where this product or service may be priced, ordered, or invoiced at any point in a supply chain. As discussed below, trade items may include individual products, as well as different combinations of products, as well as different packaging configurations of products. Each trade item, different from another in design and/or content, may be allocated a unique identification number. That is, the same identification number may be given to a particular unique product, or to a class of essentially fungible products, or to a grouping of products.

According to the EAN.UCC standard, a Global Trade Item Number (GTIN) may be used as the identifier for a trade item, to uniquely identify trade items as they are sold, delivered, warehoused, and billed throughout the retail and commercial distribution channels. Generally, a GTIN may have a 14-digit data structure, perhaps encoded within a bar code symbol, and may include a UPC designator, an EAN 13 digit identifier (EAN-13), or an EAN 8 digit identifier (EAN-8).

In FIG. 1, a trade item modifier 122 accesses a trade standards database 124 and the product objects database 118, in order to create a trade item object(s) corresponding to each of the product objects within the product objects database 118. That is, the trade item modifier 122 ensures that created trade item objects conform to a global trade standard (e.g., the EAN.UCC standard), and that the trade item objects match global trade scenarios that are desired or envisioned by the business enterprise. Then, the trade item objects may be stored within a trade item objects database 126.

Figure 2:
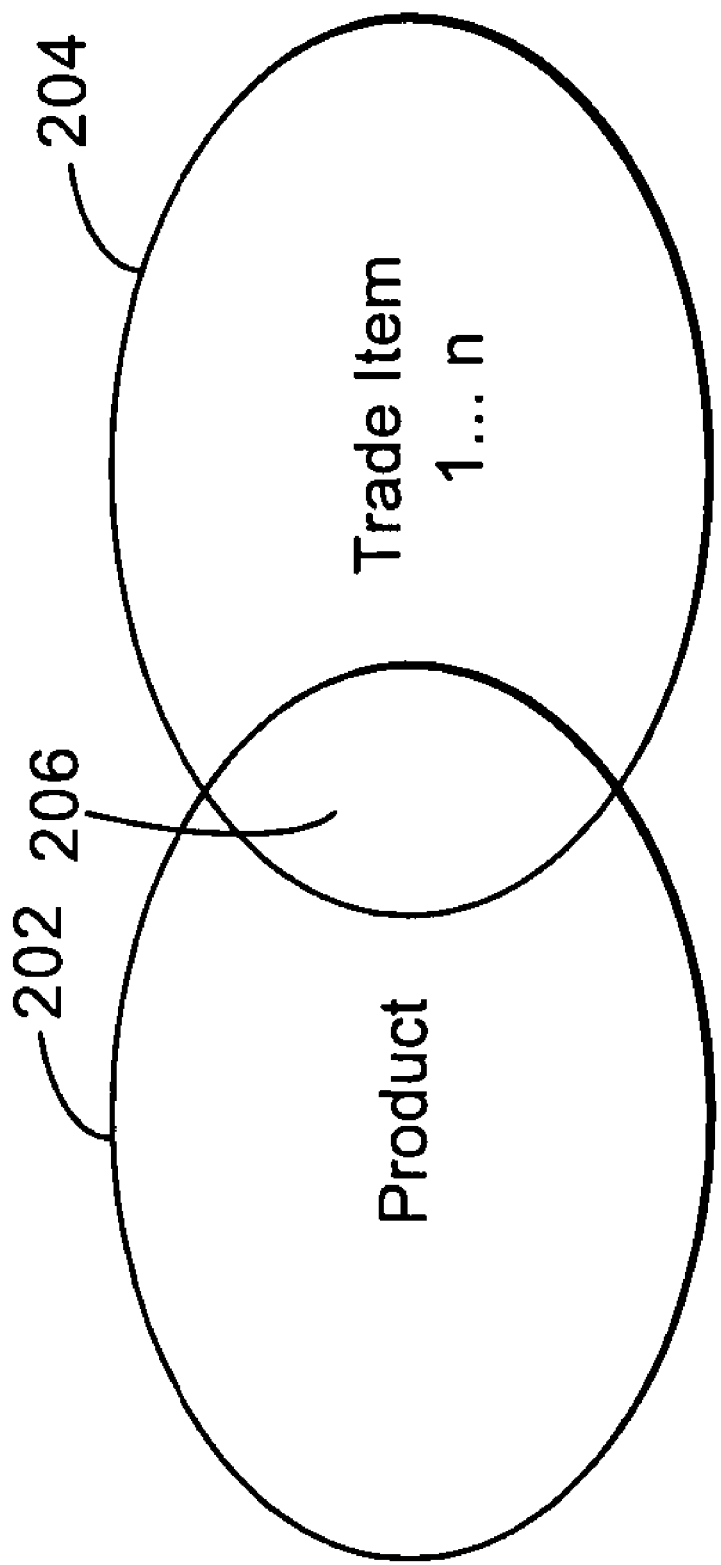
FIG. 2 is a block diagram illustrating an overlap of product objects with their corresponding trade item objects.

Thus, as shown in FIG. 2, a product object 202 may have multiple trade item objects 204 associated with it, where each of the product object 202 and trade items 204 share some subset of common attributes represented in FIG. 2 as an intersection area 206. The product object typically has a base unit of measure, which refers to a unit of measure by which a stock of the material product is managed. Alternative units of measure also may be used. Units of measure include, for example, an order unit, sales unit, or unit of issue. Alternative units of measure, which may be thought of as representing a packaging hierarchy (discussed in more detail below) may be converted to the base unit of measure by the product aggregator 116.

For example, a product such as a book may have a particular product object associated with it within the system landscape 114. Therefore, throughout the system landscape 114, the book will be referred to and described using this product object, which may contain attributes of the book, such as, for example, the author(s), publication date, title, and internal identifier (i.e., internal to the business enterprise, within the system landscape 114). Due to the data management system 100, this information will be synchronized throughout the system landscape 114, as described herein, even if the information is updated or modified over time.

When the book is traded with various global trading partners, it may be necessary or convenient to modify the attributes assigned to the book and its product object. For example, copies of the book sold in a first country may have first corresponding publication language, and may have a first set of tax information or shipping information to be associated with the book, while copies of the book sold in a second country may have different or additional attributes assigned. Further, attributes assigned to the book may differ somewhat according to trading partners who may ultimately buy or sell the book. Still further, attributes related to external features of the book may need to be modified; for example, the book may be sold with a particular promotional packaging, or may be sold as part of a group of books (e.g., if the book is part of a trilogy of books).

The data management system 100 uses the trade item objects of the trade items objects database 126 to provide such various attributes of corresponding product objects, where such attributes are dependent upon global trade standards and global trade scenarios, to global trading partners and other parties outside of the system landscape 114. Meanwhile, the data management system 100 ensures that the product objects themselves remain relatively simple, robust, and synchronized within the system landscape 114, since the product objects do not have to contain all of the information required for global trading with multiple partners.

In other words, the product objects 108, 110, and 112 generally refer to objects used within the system landscape 114, which describe an associated product in a minimal and consistent manner, for use by internal users of a business enterprise. Each product object is related to, but de-coupled for the purposes of global trading from, one or more trade item objects, where the trade item objects include information related to specific global trade standards, trade scenarios, or trading partners. This model results in a "handshake model" in which inhouse processing and operations are implemented using the product object(s), while global trade processing is implemented using the corresponding trade item object(s).

As referred to above, the GTIN generally refers to a specific unit of measure or type of packaging, such as, for example, a pack of ten pieces, or a box containing some designated amount of the material product. For this reason, the GTIN often may be assigned to a combination of a product object and its units of measure. This combination may make it possible to specify packaging data (such as, e.g., dimensions, volume, and gross weight). As a result, a product may have a 1:N relationship between itself and its GTIN(s).

Further, since a GTIN is used to identify a material uniquely, it may not generally be assigned to more than one material/packaging. However, in other implementations, the GTIN may be assigned to multiple materials/packaging. For example, material may be delivered by several sources, so that it is helpful to maintain a material number for each of them. The ultimately-finished product may then be sold under the same GTIN, in which case one GTIN may be assigned to all of these products/materials. As another example, it may be the case that a minor material change to a product (e.g., a change in ingredients of a food product that does not affect the taste, appearance, or packaging of the food product) does not warrant assignment of a new GTIN. Somewhat similarly, different materials may be used for the same product, depending on where and how the product is to be stored. Since these products are the same for all other practical purposes, they may be sold via the same GTIN, so that the same GTIN may be assigned to the different products. As a result of these and other examples, it should be understood that there may exist a 1:M relationship between a trade item and its linked products.

Based on the above, it may be seen that the described multi-assignment from products to GTINs, and vice-versa, leads to a N:M relationship between product objects 202 and trade item object 204. As a result, there are generally no identical materials/products within the data management system 100; that is, materials that have different material numbers but the same attributes. In other words, the materials must differ at least in one of their main attributes, e.g., for the logistical control thereof in global trading, or for a composition description. Also, a attributes that are shared between Material/Product and Trade Item will generally stay the same with respect to all Materials/Products to which the same GTIN is assigned.

Although the terminology "trade item" may be used within the EAN.UCC standard or in other contexts, the terminology generally refers to techniques for describing a product or service and/or for assigning a unique identifier to the product or service. Thus, the term trade item in the conventional sense does not generally refer to the concepts described herein of, for example, a related but de-coupled trade item object used in external global trading that corresponds to one or more product objects used internally within a system landscape of a particular business enterprise.

As described above and as represented by the intersection 206 of FIG. 2, the trade item objects generally share attributes with their corresponding product objects, and/or are otherwise related to their corresponding product objects. These relationships may be determined at a time of creation of a trade item object(s), and thereafter managed, by a relationship manager 128.

For example, the relationship manager 128 may detect that a trade item object is modified by the trade item modifier 122. The relationship manager 128 may then determine whether and to what extend to request modification of corresponding product object(s), or of related trade item object(s). Conversely, the relationship manager 128 may react to a modification of a product object within the product objects database 118 by requesting a corresponding modification of the corresponding trade item(s) within the trade item objects database 126.

As referred to above, trade item objects may relate differently to corresponding product objects, depending on how the product is packaged or otherwise readied for sale. For example, a manufacturer may group a pre-defined number of products, such as, for example, a case of soda or a carton of cigarettes. These groupings may be further aggregated for packaging purposes, into, for example, a pallet of soda or cigarettes. Although the product(s) may be manufactured and/or shipped in these groupings, they may later be processed or sold in a different grouping, or individually.

Similarly, different products may be grouped together for different purposes. For example, products may be assembled for delivery to a retail store as a display set, for the purpose of, for example, a Christmas display Similarly, products may be grouped or pre-packed with other products for promotional sales.

As a result of the various sales scenarios just referred to, a hierarchy of products may be defined according to the grouping(s) and/or packaging of the products. A trade item package definition system 130 may be used during this definition process.

One the trade item objects, product objects, and relationships are defined, a global access interface 132 may be used to access a data pool 134. The data pool 134 may be used in various global trade scenarios and settings, as described in more detail below with respect to FIG. 3.

It should be understood that the trade item modifier 122, in using the trade standards and other information within the database 124, creates or modifies the trade items based on the requirements of an external application that is to consume and use those trade items, which, in FIG. 1, is represented by the data pool 134 (but could be any other type of global trade application, as well). In this sense, the trade items are specific to their consuming applications, and operate in conjunction with those applications, independently of communications, if any, between the applications and the product objects.

As a result, both the product objects and the trade item objects may be kept simple and robust. For example, the product objects and trade item objects will generally contain only those attributes needed for their respective functions, so that situations may be avoided in which an undue number of attributes are included in either type of object simply because the attributes were once required, or might be required in the future.

In such situations where an undue number of attributes are included, particularly over time, the objects may become overly large and complex, such that, for example, consuming applications (and users) are not aware of the proper techniques for implementing (e.g., interfacing with) such objects. Moreover, since a large number of applications may interact with such large and complex objects, it becomes difficult to track which applications use which objects, and, as a result, it becomes difficult to modify such objects (since modifications made with one consuming application in mind may have an unforeseen and unintended consequences with respect to other applications). In contrast, in the system of FIG. 1, the trade item objects may be created or modified with only limited numbers of consuming applications in mind, so that inadvertent consequences to interfacing with those applications may be minimized. Moreover, since the trade item objects are de-coupled from the product objects as described herein, changes to the product objects may be made without necessarily affecting the trade item objects.

Figure 3:
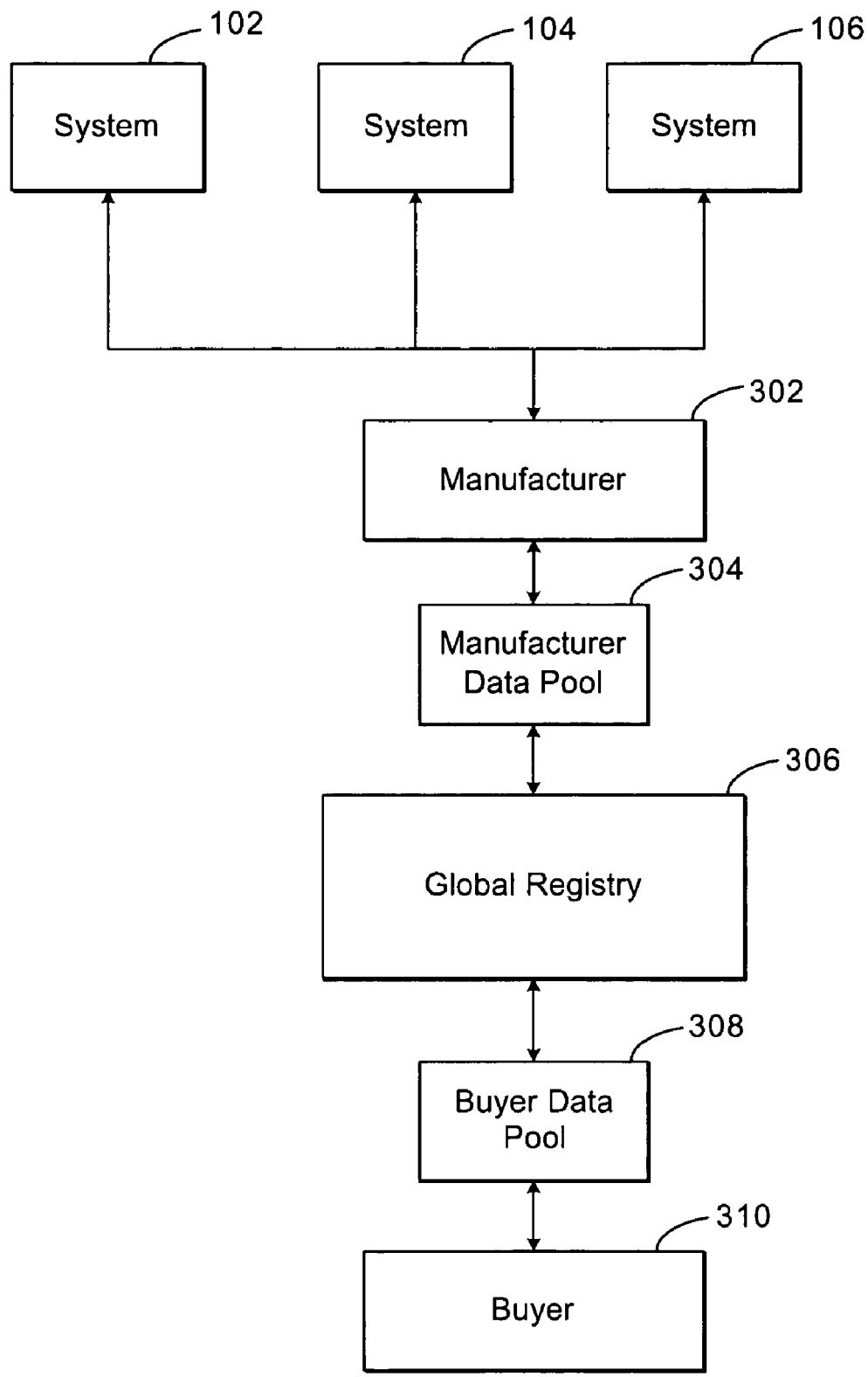
FIG. 3 is a block diagram of a global trade scenario involving the data management system of FIG. 1.

In FIG. 3, an example is shown in which the systems 102, 104, and 106 belong to a business enterprise represented by a manufacturer 302. The manufacturer 302 aggregates product objects and generates corresponding trade item objects, as discussed above, and publishes the trade item objects to a manufacturer data pool 304.

The manufacturer data pool 304 represents, for example, data from a number of different manufacturers. The data is consistent with a selected global trade standard, such as, for example, the EAN.UCC standard, and, as such, is stored within a global registry 306. The global registry 306 is accessible by a buyer data pool 308, which may be accessed by one or more buyers 310.

In this way, the manufacturer(s) 302 and the buyer(s) 310 may efficiently conduct their manufacturing and purchasing operations. For example, the buyer 310 may initiate or investigate a purchase order from a number of different manufacturers, or may investigate pricing of a particular product by various manufacturers. Due to the fact that product descriptions are consistent within the global registry 306, all of the manufacturer(s) 302 and buyer(s) 310 are able to make valid comparisons between products, even when the products are produced or consumed by different and totally unrelated parties. Moreover, In FIG. 3, the manufacturer 302 may use the data management system 100 of FIG. 1, so that the data pool 304 (corresponding to the data pool 134 of FIG. 1), and thereby the global registry 306, contains trade item objects corresponding to those stored within the trade item objects database 126. However, it should be understood that, since the trade item objects conform to the EAN.UCC (or other applicable) standard, the trade item objects are indistinguishable from other contents of the global registry 306 to users thereof (e.g., the buyer 310). That is, although many manufacturers may contribute to the data pool 304 and/or the global registry 306, it is not necessary for all such manufacturers to use the data management system 100 in order for one or more of the manufacturers to make use of the system 100.

Thus, the EAN.UCC standard, or other applicable trade standard, allows the setup of standardized processes and a common business language. By using such trade standards, participating parties may take advantage of, for example, system-to-system integration, end-to-end automation, lower costs, reduced number of ordering and other errors, reduced risk of system incompatibilities, and eliminated roadblocks and bottlenecks within particular supply chains.

Figure 4:
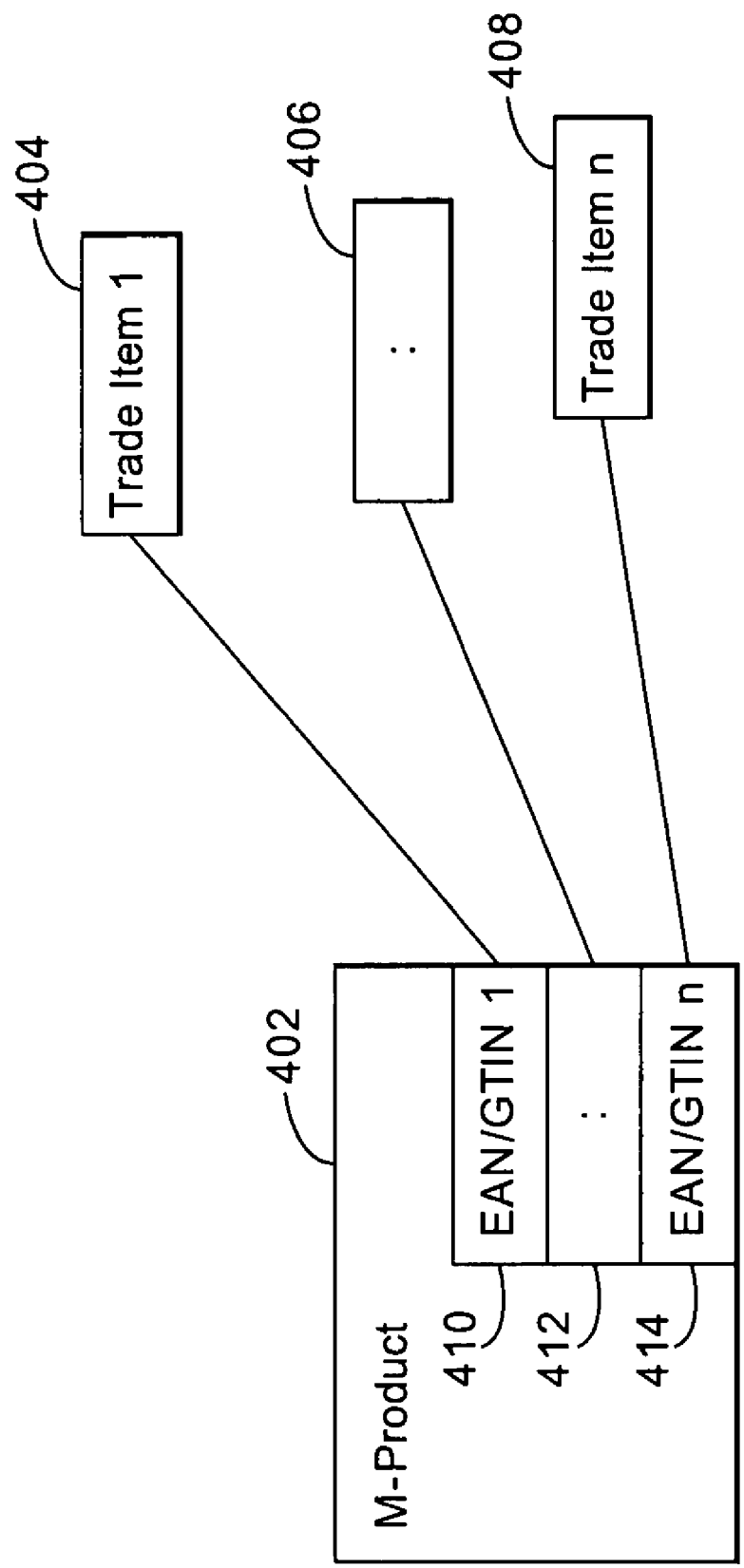
FIG. 4 is a block diagram illustrating a relationship of a product object to a plurality of trade item objects.

FIG. 4 is a block diagram illustrating a relationship of a product object 402 to a plurality of trade item objects 404, 406, and 408. In FIG. 4, the trade item objects 404, 406, and 408 do not appear as stand-alone objects. Instead, the trade item objects 404, 406, and 408 depend on corresponding objects 410, 412, and 414, where each of these are assigned a uniquely-identifying EAN/GTIN number, so that the objects 410, 412, and 414 may each correspond, for example, to a different unit of measure of the product 402. The trade item objects 404, 406, and 408 depend on their corresponding objects 410, 412, and 414 for their definition and existence.

Figure 5:
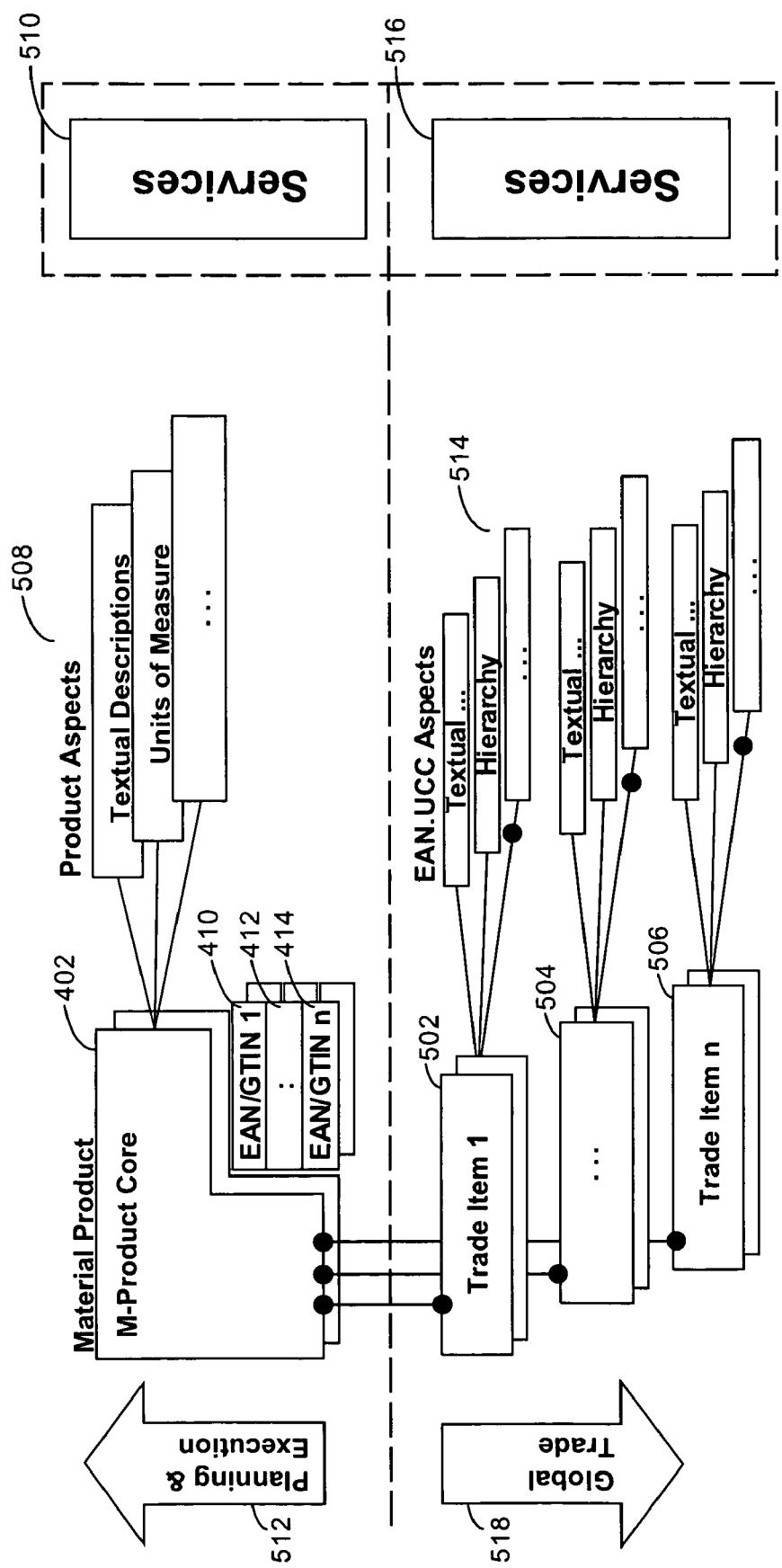
FIG. 5 illustrates a block diagram of a distribution of responsibility for trade item objects.

FIG. 5 illustrates a block diagram of a distribution of responsibility for trade item objects 502, 504, and 506. In FIG. 5, the trade item objects 502, 504, and 506 essentially represent stand-alone objects that may have a relation to the product object 402, but do not require product objects 410, 412, or 414. That is, as described above with respect to FIG. 1, the product object 402 has certain attributes or aspects 508 that allow the product object 402 to provide service 510 within a planning and execution stage 512 associated with the product object 402 (e.g., execution processing along a development and production chain for the corresponding product within the system landscape 114). For example, the aspects 508 may include textual descriptions of the product, or units of measure of the product.

Meanwhile, the related but independent trade item objects 502, 504, and 506 each contain attributes or aspects 514, which may or may not overlap with, or be related to, the aspects 508, and which are designed to provide services 516 within global trade scenarios 518. In this way, applications that interact with the trade item objects 502, 504, and 506 within the global trade scenarios 518 may implement trade item interactions, while the processes based on the product object 402 remain unchanged and de-coupled from the global trade scenarios 518.

Figure 6:
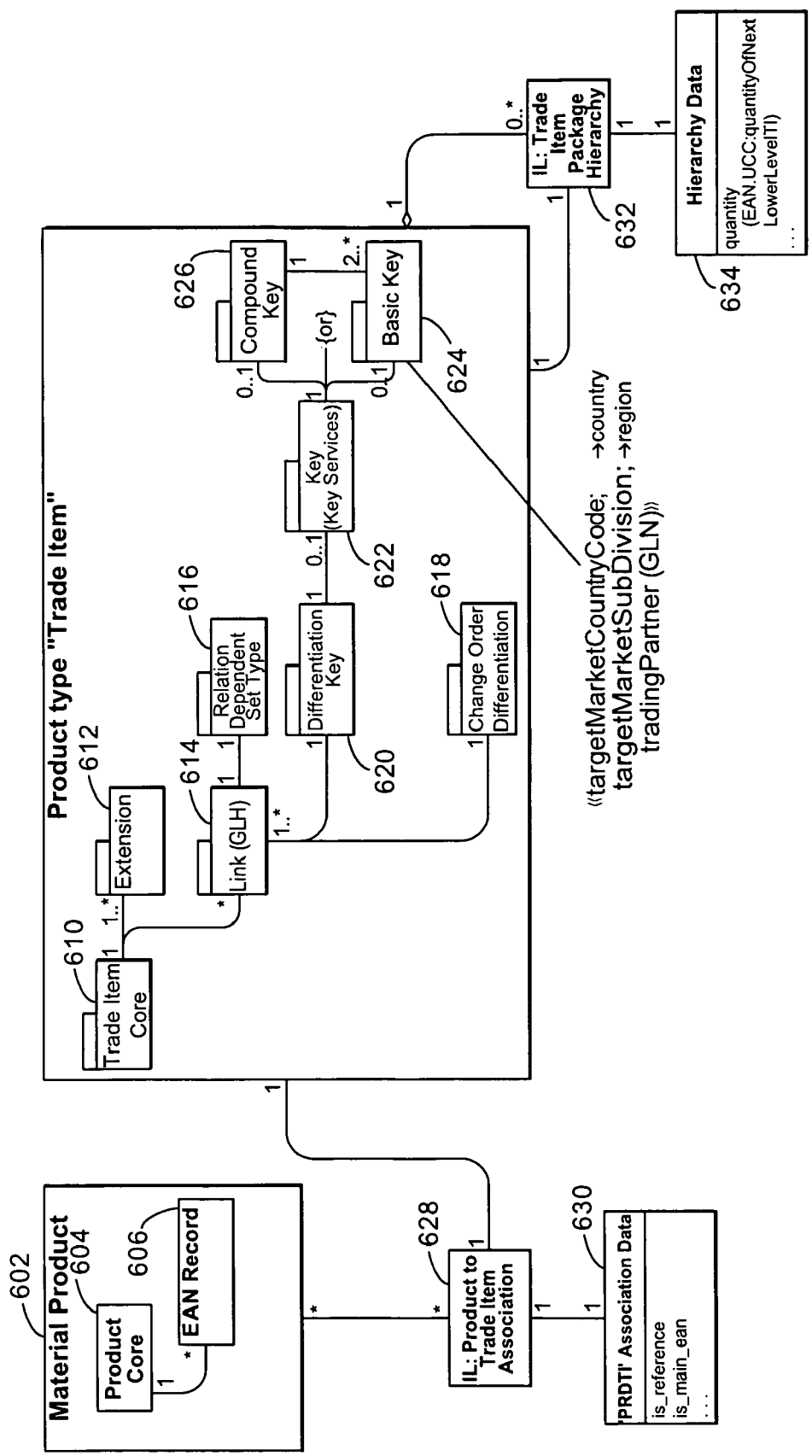
FIG. 6 is a block diagram showing a design of an implementation of a trade item object(s).

FIG. 6 is a block diagram showing a design of an implementation of a trade item object(s). In FIG. 6, a product object 602 includes a product core 604 and an EAN record 606. The product core 604 may include, for example, attributes of the product object 602, as well as rules for governing the product object, such as, for example, persistency rules governing a persistence of the product object 602 across sessions. The EAN record 606 may include, for example and as has been discussed, a GTIN number(s) associated with the product object 602, or some other type of identifier(s).

A trade item object 608 similarly includes a trade item core 610, which may include, for example, attributes of the trade item object 608. An extension 612 to the trade item core 610 permits the addition of further attributes to the trade item object 608, such as might be useful in particular or specialized situations or scenarios.

A link 614 relates the trade item core 610 into a decomposition of the attributes thereof into a number of groupings, or "set types." That is, the trade item object 608 may have different versions that are defined by attribute groupings or associations. Relation-dependent set types 616 refer to set types that are dependent on different relationships that may exist between the various set types. Somewhat similarly, change order differentiation 618 permits definitions of different versions of trade items by, for example, date ranges (e.g., a "valid from" date), data ranges, or other types of validity definitions.

A differentiation key 620 also enables a technique for defining versions of trade items based on set types of the trade item object 608. For example, a differentiation key may represent a country (e.g., a target market country code), a region (e.g., a target market sub division), or a trading partner (e.g., a global location number (GLN), which typically includes a 13-digit number used to uniquely identify any legal, functional or physical entity as a function of location. Its components may include an EAN.UCC company prefix, a location reference, and a check digit). A differentiation key also may be referred to as a Generic Link Handler (GLH), or any mechanism for managing the linking of objects and/or set types to a selected parameter.

The use of key services 622 allows for the use of the differentiation keys 620 for data segmentation, used to obtain consistent data storage within the data management system 100. The key services 622 includes a basic key (624), which may refer to, for example, a plant or warehouse, as well as a compound key(s) 626, which may refer to, for example, a sales organization or a distribution channel.

Referring back to the differentiation key 620, the described use of a target market country code and the target market sub division may be used to encompass the global/local scope of the attributes of the trade item object 608. For example, each attribute that needs to have different local values may be maintained with reference to a specific combination of a country and a region. As another example, to describe a global set of attributes, the differentiation keys may be initialized, or assigned similar values to one another, to thereby define a global record.

Further, differentiations may be maintained by country and/or region, and such records may be interpreted as local redefinitions of the global record (thereby avoiding multiple maintenance of attributes, with no local differentiation therebetween). A valid combination of country and region may be selected for a set-up of a basic key list, and, if any other combination is required, the key services 622 may provide a user interface with which a user may add such combinations. As referred to above, compound keys 626 allow for, for example, the differentiation by target market, sub division, or trading partner. Generally speaking, with respect to behavior of the differentiation key(s) 620, each combination of basic keys 624 used for trade item differentiation may be defined within the key services 622. This structure may be used to maintain valid combinations within the data management system 100, so as to reduce the need for maintenance of the combinations by other users thereof.

The trading partner key (e.g., the GLN) may be used to organize attribute values of the trade item object 608 with respect to particular trading partners, i.e., to define a trading-partner dependency of the trade item object 608. The GLN may be based on the EAN/UCC-13 standard to identify physical entities (e.g., a room of a building or warehouse gate), functional entities (e.g., a purchasing department within a legal entity, an accounting department, or a returns department), or legal entities (e.g., whole companies, subsidiaries, or divisions). An implementation of the trading partner dependency of the trade item object 608 may include a new basic key 624 associated with the key services 622.

GLN attributes may include, for example, a global location number (GLN), alternate party identification types, alternate party identifications, a communication channel, a contact entity, a facility specification, name and address information, dates, financial information, and behaviors. Such behaviors that may serve as identifiers for application using the GLN(s) include, for example, "ship-to" or "deliver to" parties, "bill-to" parties, or "purchased from" parties.

The condition "trading partner dependant" may be applied to any trade item attribute having a value that is dependant on a buyer and seller relationship. Such a trading partner dependant attribute may be restricted to one set of attributes per GLN of a party that is receiving data, and may have a value(s) that is dependant on a specific point-to-point agreement between the buyer and the seller.

The GLN may be used to act as a surrogate key in order to ensure that an implementation is decoupled from an instance of an object designated as a business partner object, while enabling a relation between the GLN instance and the business partner instance if desired. In this way, for example, cleansing of the business partner object does not affect the differentiations (versions) of the trade item object 608. In other words, in such implementations, a GLN may exist on its own, independently of a business partner object The GLN also may be used to refer to specific trade item attributes. For example, attributes known as "BrandOwner," "InformationProvider," or "Manufacturer," referring to types of trading partners, also may be based on the GLN. In this way, users may be able to distinguish between different organizational units within a company. For example, the "InformationProvider" may be defined on a corporate level, as well as on a subsidiary level.

As discussed with respect to FIG. 1, the relationship manager 128 maintains relationships between the product object 602 and the trade item object 604, shown in FIG. 6 as a product-to-trade item association 628, which bases the association on association data 630. For example, although the trade item object 608 and the product object 602 may be independent of one another for the purposes of global trading scenarios, the trade item object 608 may correspond to a GTIN record of the product 602.

In this case, certain attributes may appear at both the GTIN level of the product object 602, as well as at the trade item object 608 itself. For example, such redundant attributes may include the GTIN, a unit of measure, a quantity (e.g., a factor of the base unit of measure), gross weight, net weight, volume, length, width, or height. In some implementations, the trade item modifier 122 will derive the redundant attributes as part of a creation or modification of trade items. Also, the relationship manager 128 may be used to determine the redundant attributes, for example, after one of the product objects 118 has been modified.

In scenarios in which a trade item object corresponds to a GTIN record of a product object, product object may be referred to as the reference product, from a trade item perspective. For example, three different behaviors include scenarios in which redundant attributes of a product object's GTIN record stay in synch with corresponding attributes of the trade item object, a redefinition of the redundant attributes at the trade item may be used, should be possible, and/or trade items that have different values for redundant attributes may be realigned with a corresponding GTIN record of a product object.

When a trade item object is created by the trade item modifier 122 based on the GTIN information of a product object, this relation may be created automatically, or, if the trade item object was created individually, the relation may be created manually. Once this relation is created, the relationship manager 128 may detect a difference between the redundant attributes of the trade item object and a corresponding GTIN record of the reference product may be used to trigger a workflow process in which the related trade item and product instances are collected in a work item assigned to a responsible organizational unit for clarification or correction.

In other words, the relationship manager 128 may be used as a monitor that identifies the trade item 608 when its redundant attributes differ from a corresponding GTIN record of the product object 602. In some cases, the redundant attributes should no longer be clarified or corrected as such, but rather should remain independent of one another. For example, a given attribute may change for the product object 602 but not for the trade item object 608, or vice-versa. In this case, the relationship manager 128 may denote in the association 628 and/or the association data 630 that the previous redundancy should no longer be maintained. As a result, the system 100 is operable to concentrate on an analysis of changes in redundant attributes, in order to provide a flexible technique for relating the product object 602 with the trade item object 608, without requiring a dependency therebetween.

It should be understood from the above that, in some implementations, the GTIN may be used as a unique identifier of a trade item object. However, in other implementations, a separate identifier may be used as the primary key for data base storage; for example, separate primary keys may be established as a primary internal key and a primary external key. In this way, use of the data management system 100 is essentially independent of the GTIN, and the GTIN may simply be used as an attribute of its associated trade item object(s). As a result, for example, the GTIN need not be used as the primary key its associated trade item object within the global registry 306 of FIG. 3. Instead, a primary key may be used that includes, for example, a combination of the GTIN, the target market, and the information provider GLN. In such an example, a particular trade item object may be registered by different information providers that may offer the trade item with different values from one another (e.g., a manufacturer, a distributor, or a retailer).

Figure 7A:
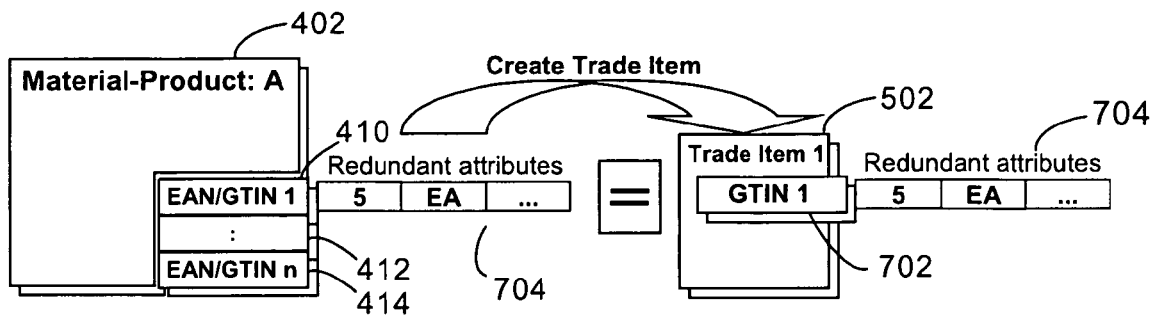
FIGS. 7A-7C are block diagrams of a process for maintaining relationships between product objects and trade item objects.
Figure 7B:
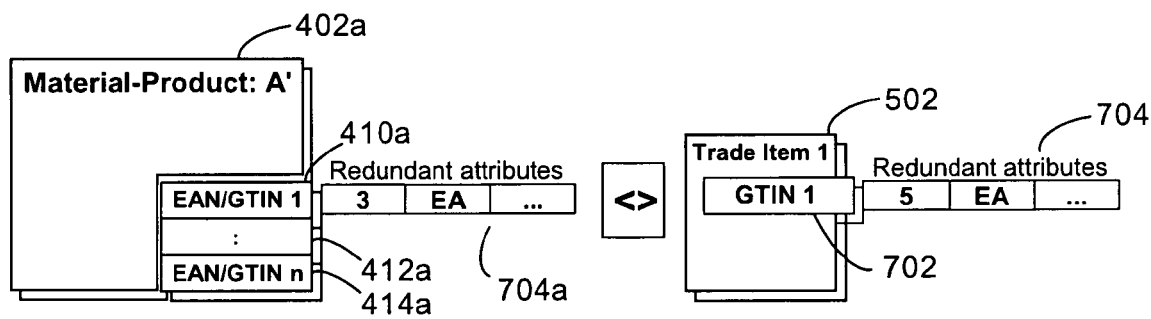
Figure 7C:
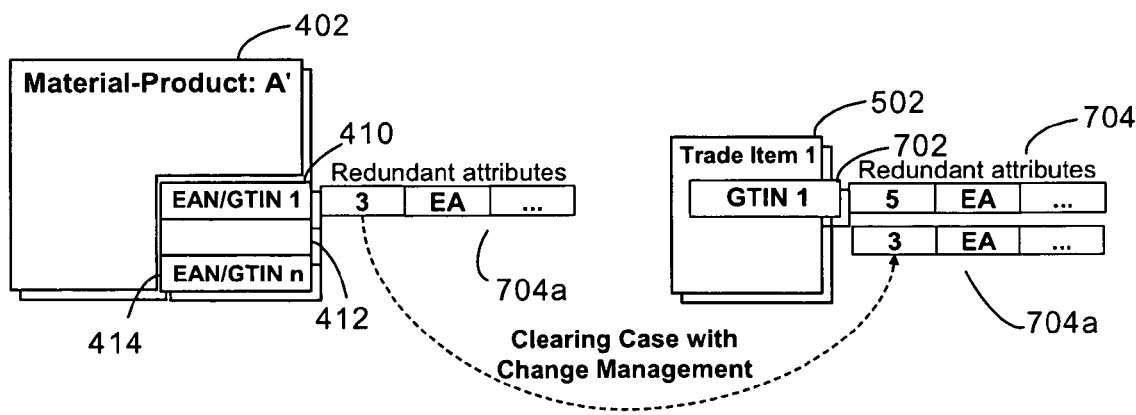

FIGS. 7A-7C are block diagrams of a process for maintaining relationships between product objects and trade item objects. Specifically, FIG. 7A illustrates the case where the product object 402 and the trade item object 502 share a GTIN 702 associated with redundant attributes 704. In FIG. 7B, a new version of the product object 402, labeled 402*a*, is uploaded to the data management system 100, having attributes 704*a* that are no longer completely redundant with the attributes 704.

As just discussed, the monitoring function of the relationship manager 128 may detect the incongruity and initiate a workflow in which, for example, a manual clearing or maintenance of the mismatch is requested. For example, the trade item object 704 may be changed to match the product object 704*a*, or may be left unaltered, depending on a determination and evaluation made by a user in the context of the workflow.

It should be understood from FIGS. 7A-7C, and from the above discussion, that the overall relationship between the product object 402/402*a* and the trade item object 502 is not affected, nor does automatic synchronization occur in this implementation. Rather, the implementation takes into account the possibility that an attribute value of the product object 402 may have changed, without necessarily requiring the same change in the corresponding trade item object 502.

Figure 8:
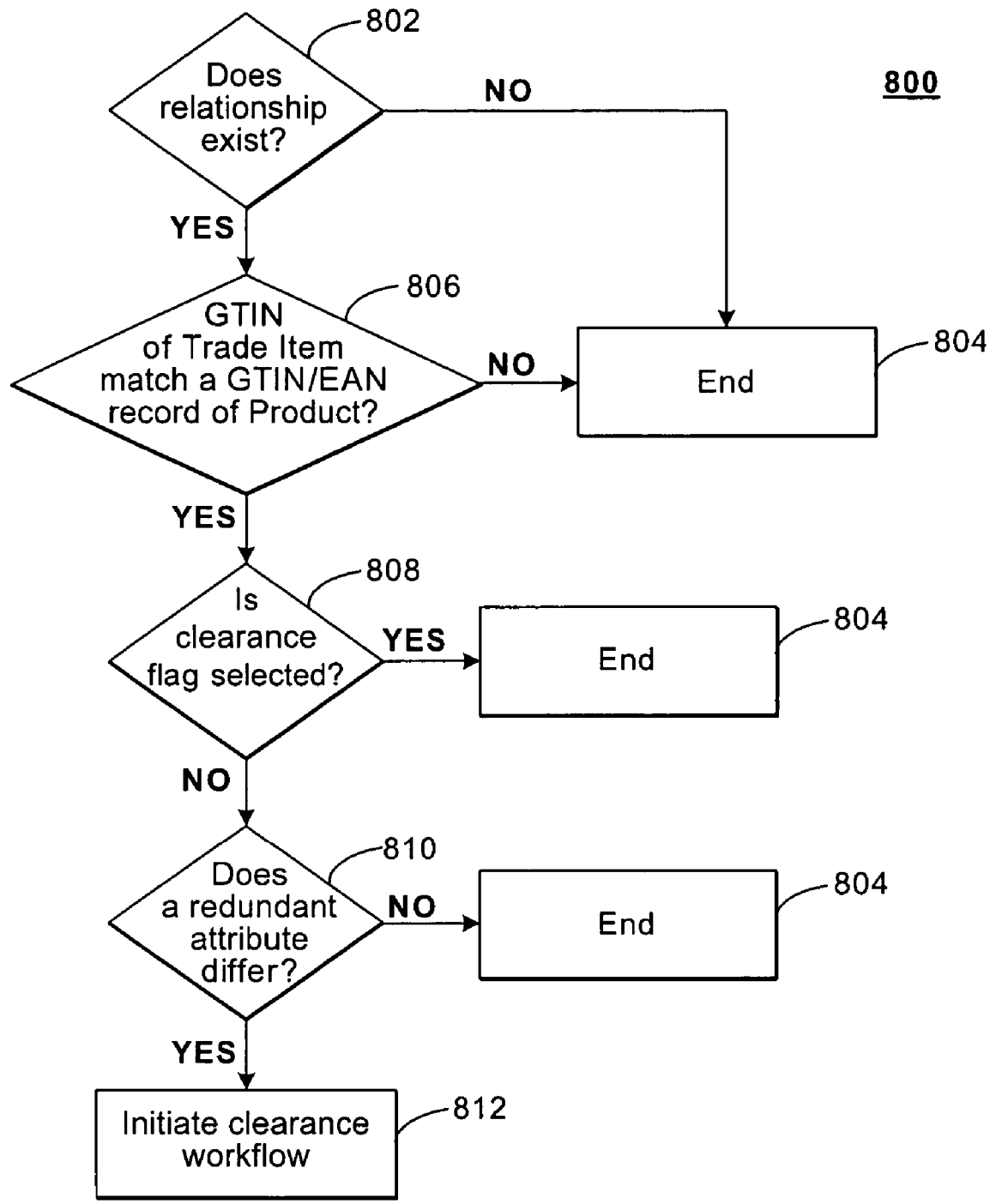
FIG. 8 is a flowchart illustrating an example of a synchronization workflow for a product object and a trade item object.

FIG. 8 is a flowchart 800 illustrating an example of a synchronization workflow for a product object and a trade item object. As just explained, such a workflow may be used to achieve a tight integration of the product object GTIN and a corresponding trade item object. This workflow may be used during a creation or modification of a trade item object by the trade item modifier 122, or, conversely, for the creation or change of a product object by the assigned to a GTIN/EAN product object aggregator 116 and/or the product modifier 120 where a trade item object already exists with the same GTIN.

In FIG. 8, then, the workflow begins by considering whether a relationship exists between the relevant trade item object and product object (802), e.g., whether they share certain attributes, or a certain number of attributes. If not, the workflow ends (804).

If so, the workflow determines whether the GTIN of the trade item object matches a GTIN/EAN of a corresponding product (806). Again, if not, the workflow ends (804). If so, then the workflow determines whether a clearance flag has been selected (808), where the clearance flag is used to indicate that the product object and trade item object are permitted to differ in value(s). This permission for such variation in value(s) may be granted, for example, either during a design process and/or during the automatic creation process of the trade item(s) by the trade item modifier 122. Thus, if the flag is selected, then the workflow may end (804), since there would be no need to synchronize any differing values.

If the clearance flag is not selected, then the workflow determines whether the redundant attribute differs in value (810). If not, the workflow ends (804). If so, then the workflow initiates a clearance (812) for appropriately performing data alignment between the relevant attribute(s) of the trade item object and the product object.

Figure 9:
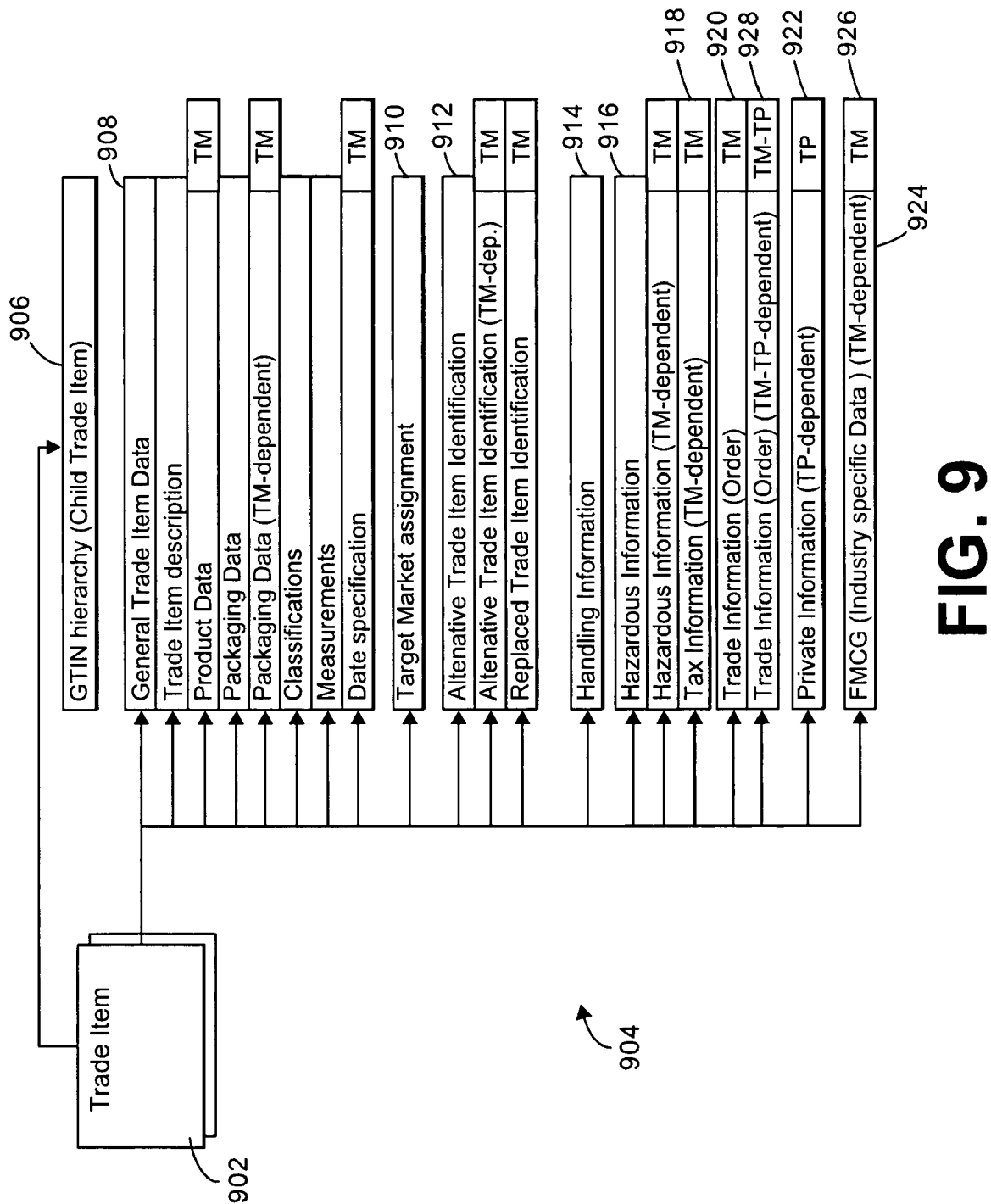
FIG. 9 is a data model illustrating an example of trade item attributes and aspects that may be used by the data management system of FIG. 1.

FIG. 9 is a data model 900 illustrating an example of trade item attributes and aspects that may be used by the data management system of FIG. 1. In FIG. 9, a trade item object 902 includes various attributes 904. Of course, the attributes 904 are merely examples of possible trade item attributes, and many other attributes may be used and/or substituted.

In FIG. 9, and as referred to above, it may be seen that the attributes 904 are semantically organized to construct groups or sets of attributes, each of which defines an aspect of the trade item object 902. This may be done according to, for example, a particular business context. As another example, the sets may be organized according to particular relationships between the attributes, as discussed in more detail below.

A first attribute set 906 includes attribute data relating to a GTIN hierarchy associated with the trade item 902. The GTIN hierarchy may refer generally to, for example, the packaging hierarchy referred to above and discussed in more detail below, according to which trade items within a particular hierarchy may be thought of as having a parent-child relationship.

A second attribute set 908 includes general identification information for the trade item 902. For example, the set 908 includes general trade item data, a trade item description, product or packaging data, classifications (e.g., according to the EAN.UCC standard) or measurements of the trade item object 902, and date specifications associated with the trade item object 902 (e.g., a valid-from date).

In some implementations, the set 908 may be considered to include data associated with the above-described attributes, while in other implementations, the set 908 may be considered to include a sub-set for each of the fields discussed above and shown in FIG. 9. In other words, each of the attributes shown in FIG. 9 may be considered to represent its own attributes set, including further (sub-) attributes (not shown). Similar comments apply to the other various attributes and sets shown in FIG. 9 and discussed further below.

In some implementations, the primary identification of the trade item object 902 within the data management system 100 is a designated Trade Item ID. The GTIN may be used as an alternative identification. In this way, the trade item modifier 122 may create trade items even when a GTIN of an associated product is missing.

Location of the GTIN at the attribute set level 908 (general data) allows flexibility within the creation process for the trade item object 908, and also corresponds to the design of the GTIN with respect to the corresponding product object. As such, individual numbering or check routines of the GTIN for the trade item object 902 may be used in synch with the GTIN at the corresponding product object. Further, when the trade item object 902 is created based on a corresponding product object, the GTIN of the trade item object 902 may be assigned together with the redundant attributes of the trade item object and product object.

In some implementations, different identifiers for the single trade item 902 are grouped in the identification set 908. The GTIN may be used as the major key for the trade item object 902. Additionally, further IDs may be added. For example, it is possible to store an internal identifier for the trade item object 902 (e.g., a material number), or the ISBN (International Standard Book Number), and/or the ISSN (International Standard Serial Number).

A third set 910 includes a target market assignment associated with the trade item object 902, while a fourth set 912 includes alternative or replaced trade item identifications. A fifth set 914 includes handling information for the trade item object 902.

A sixth set 916 includes hazardous information related to the trade item object 902. For example, the trade item object 902 may be created with respect to hazardous chemicals, or medical waste products. A seventh set 918 includes tax information, while an eighth set 920 includes trade information for trading the trade item object 902. Finally, a ninth set includes private information of particular trading partners, while a tenth set 924 includes industry-specific data that may be relevant when during global trade scenarios.

The EAN.UCC standard itself has defined at least 153 attributes, examples of which are shown in FIG. 9. Although some may represent simple attributes that are assigned directly to the trade item object 902, others, as discussed above, are relationship-dependant.

For example, attributes may depend on a target market in which a corresponding product will be sold, where the target market may be represented by a country code or other identifier, and shown as a TM designator 926 in FIG. 9.

Alternatively, or additionally, an attribute may be related to, or dependent on, a particular trading partner, which, as referred to above, may be represented by a globel location number (GLN), as shown by a TM-TP designator 926 in FIG. 9.

As referred to above, the EAN.UCC defines an object referred to as a trade item, and, to the extent that the trade item modifier 122 creates the trade item 902 in accordance with the EAN.UCC as determined from the standards database 124, the trade item object 902 will match the EAN.UCC standard. As such, it should be understood that full descriptions exist for conventional trade item objects and their attributes, business rules, and validations in the context of the EAN.UCC standard, and that the present description does not provide such full descriptions. Of course, it should be understood that the EAN.UCC descriptions may be used to their full extent by some implementations, while other implementations, which may not directly use the EAN.UCC standard, may use variations of the EAN.UCC descriptions, or (in the case where some other trading standard is used), may use other descriptions entirely.

Some examples of such descriptions, as they relate to the data management system 100, are referred to above, and described in more detail, below. For example, the trade item object 902 may typically have the ability to store multiple values for a single attribute. One example of such a multiple value is packaging, as, for example, a product may need to be wrapped in a first material when sold by a first trading partner, but may need to be wrapped in a second material when sold by a second trading partner.

Another feature that may be associated with the trade item object 902 is time-dependency. For example, information provided by a manufacturer to a business partner may be declared valid within a defined time frame. In this way, reliability of the information provided in global data synchronization scenarios may be ensured.

Global and/or local attributes also may be defined. In this way, communicated attributes may be limited to those relevant for receiving parties within a particular geography. Generally, then, a global attribute indicates that the attribute is relevant for business cases around the world, and, as such, will typically have a single value throughout the world. An example of a global attribute is the GTIN. A "global/local" attribute indicates that the attribute or field is relevant for business cases around the world, and that its definition is the same around the world, but that the attribute or field may have a different value depending on the geography of the receiving users. Examples of global/local attributes are tax values, which may differ by country for various products. Finally, a local attribute may only be relevant in certain geographical areas, so that the values may totally change based on where the product is offered for sale.

The features of global/global-local/local may or may not depend on a designated target market value of an attribute. For example, an attribute having the condition global may (as just explained) have only one global value (except where there are multiple values allowed, referred to above and discussed in more detail below). On the other hand, an attribute having the condition global-local may have one value per Target Market specified (again, except where there are multiple values allowed). As explained above, a global-local attribute indicates that the attribute/field is relevant for business cases around the world, that its definition is the same around the world, but that it may have a different value depending on the geography.

Values for an attribute may vary due to a relationship with the party receiving the data, e.g., a trading partner. A rule referred to as the "trading partner neutral/trading partner dependent" rule provides information about this relationship. For example, the condition "trading partner neutral" may be applied to any attribute that has a value that is independent of a buyer and seller relationship. Generally speaking, an attribute having the condition trading partner neutral may have only one set of values.

However, the condition "trading partner dependent" may be applied to any attribute having a value that is dependent on a buyer and seller relationship. Generally speaking, an attribute having the condition trading partner dependent may have only one set of values per GLN of the party receiving the data. Thus, such attributes represent attributes having a value that is dependent on a specific point-to-point agreement between a buyer and a seller.

Finally in this regard, an attribute having the condition "trading partner neutral & trading partner dependent" may have only one set of values for the trading partner neutral value, and one set of values per GLN of the party receiving the data.

Thus, as generally discussed above, various features of the trade item object 902 awil generally be present in order for the trade item object 902 to be compliant with the EAN.UCC. For example, the trade item may support multi-values for single attributes, time-dependency, global/local attributes, Trading Partner Neutral/Trading Partner Dependent attributes, industry specific attributes, language-dependency, and data validations according to the EAN.UCC standard.

Further, with respect to business requirements, the trade item object 902 may provide options for enhancements and adjustments (e.g., to reflect updates to the EAN.UCC standard, or for customer enhancements), workflow integration for data maintenance, and synchronicity between the attributes that are assigned to both the trade item object 902 and it corresponding product object (e.g., directly linked, or validated via a clearing case). A field may be designated to indicate whether the trade item data should be distributed to an external data recipient (e.g., a service provider, marketplace, data pool, or business partner). Also, a field may be designated to indicate a distribution status (e.g., whether data was successfully distributed to a designated recipient).

Referring back to FIG. 6, and, as discussed with respect to FIG. 1, the trade item package definition system 130 may be used to define trade item package hierarchies 632, so that associated hierarchy data 634 may be stored in association therewith. Such a trade item hierarchy describes how the Trade Items are linked according to their packaging. In some cases, a single trade item may belong to more than one hierarchy; for example, when a box is packed on different types of pallets.

Figure 10:
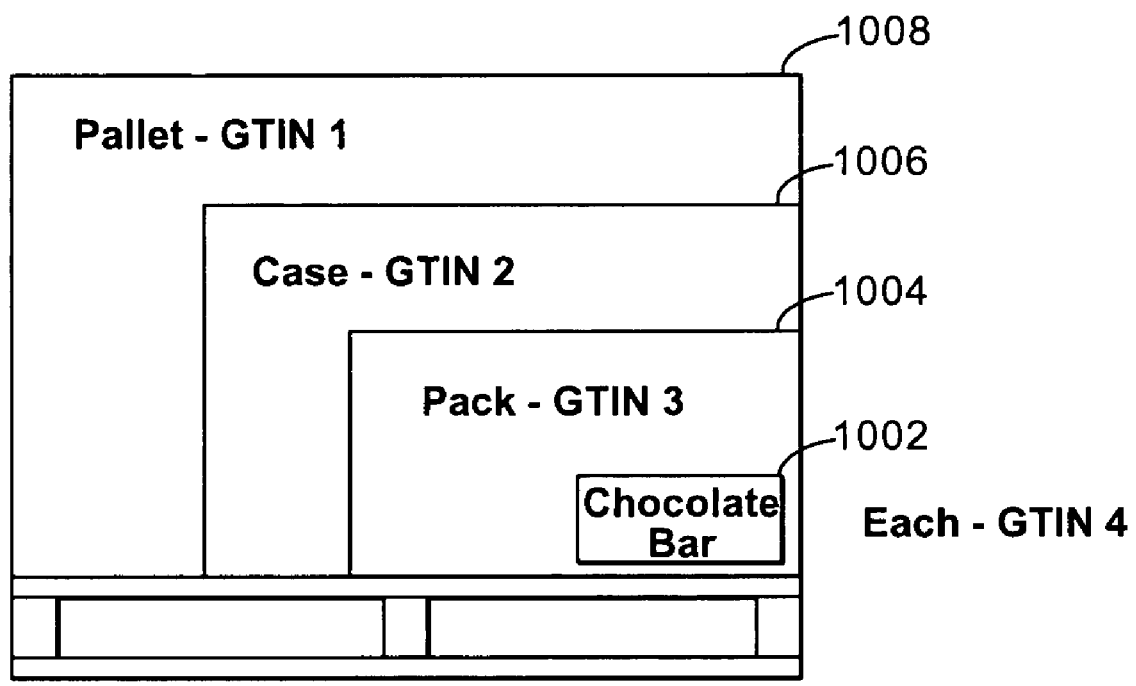
FIG. 10 is a block diagram illustrating an example of a trade item package hierarchy.

FIG. 10 is a block diagram illustrating an example of a trade item package hierarchy 1000. In FIG. 10, a product 1002 (in this case, a chocolate bar) has its own GTIN. A pack 1004 of the chocolate bars has its own GTIN, as does a case 1006 of the packs, and a pallet 1008 of the cases. In some implementations, each GTIN at a higher level may include all lower-level GTINs within itself.

In some implementations, a fixed number of levels is defined for a given trade item hierarchy, where each level has an individual identification. However, because the trade item object is de-coupled from its corresponding product object, as described herein, it may be possible and advantageous to define individual sequences of packaging hierarchy levels, and possible next lower levels may be assigned in association with the defined levels. Then, once this sequence of hierarchy levels is defined, each Trade Item may be assigned to a hierarchy level.

Figure 11:
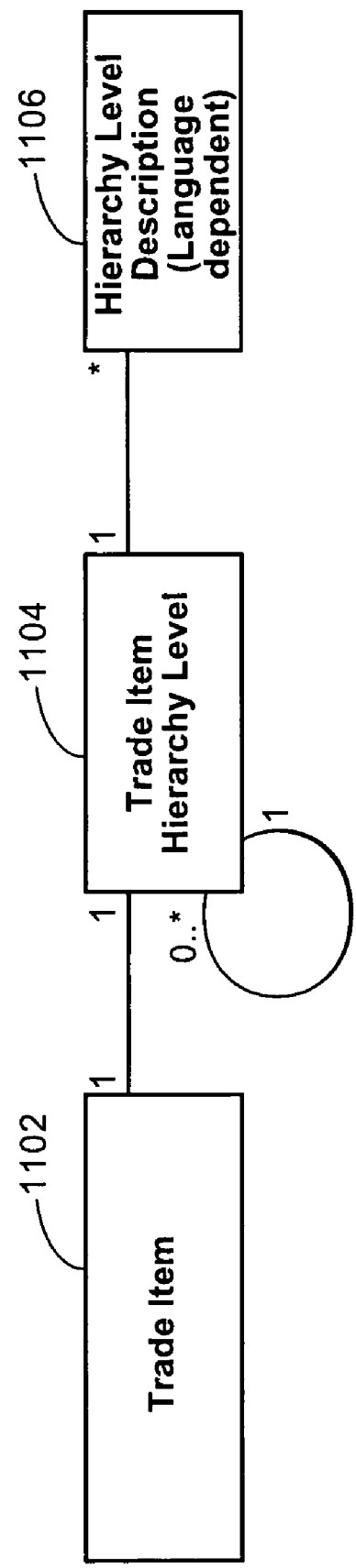
FIG. 11 is a block diagram illustrating examples of relationships between trade items, their packaging hierarchies, and their hierarch level descriptions.

For example, in FIG. 11, a trade item object 1102 is assigned to a trade item hierarchy level 1104, which is described or defined by a (language-dependant) hierarchy level description 1106. For example, a hierarchy level may be defined that has a given number of child levels, and may be described as, for example, a mixed module, a pallet, a display unit, a case, a pack, or an individual unit. Other levels and descriptions may be added, as well, and single trade items may be part of more than one hierarchy.

Figure 12:
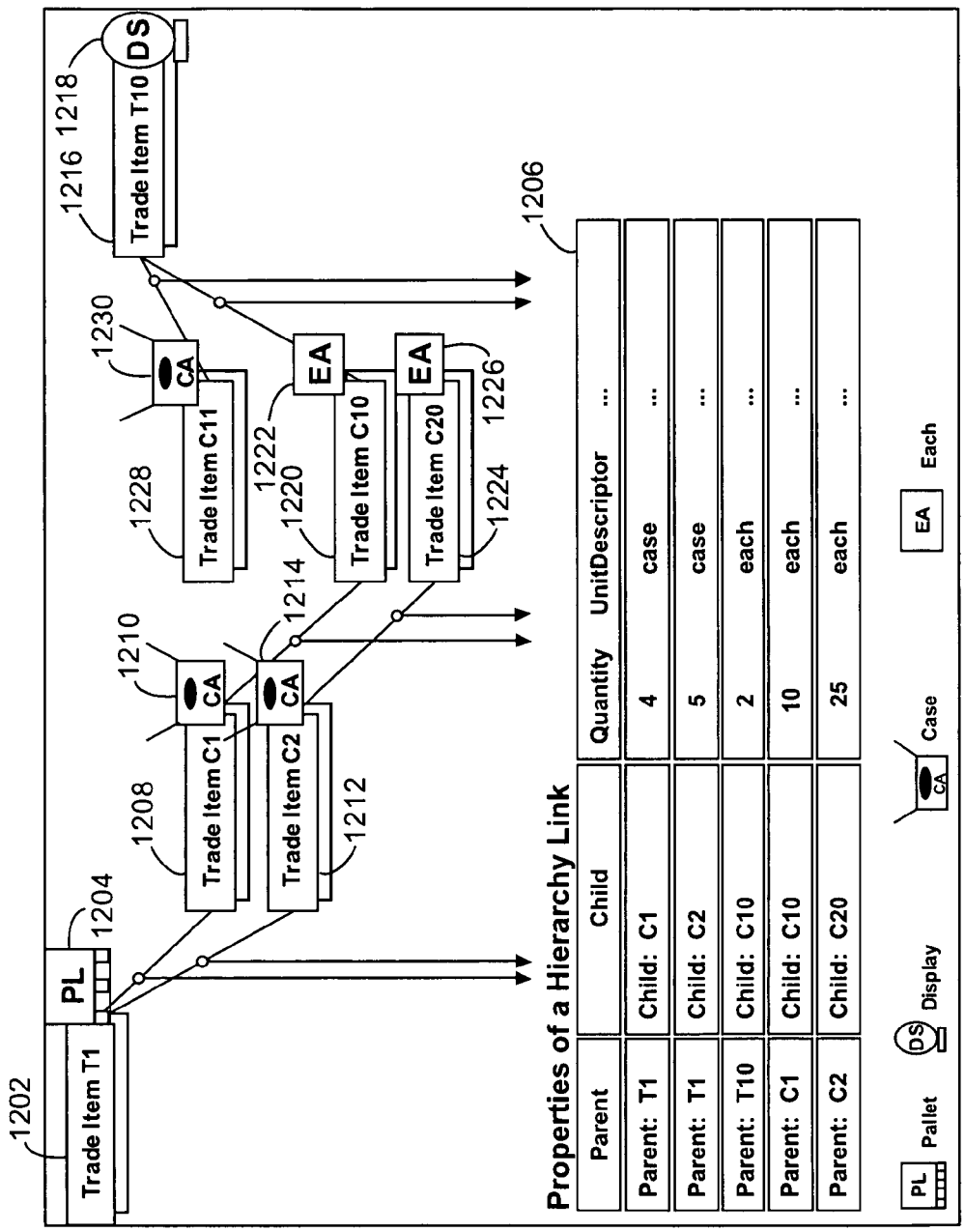
FIG. 12 is a block diagram illustrating examples of relationships between trade items and packaging hierarchies.

FIG. 12 is a block diagram illustrating examples of relationships between trade items and packaging hierarchies. In FIG. 12, a trade item 1202 is a parent that is associated with a pallet 1204. As shown by table 1206 and by the relevant connectors, the parent trade item 1202 has a child trade item 1208 that is packaged as a case 1210, where the child 1208 includes four cases within the pallet 1204. Similarly, the parent 1202 includes a child 1212 that is packaged as a case (specifically, five cases included within the pallet unit 1204). Further, a parent 1216 is packaged as a display 1218, and includes a child 1220 that is packaged individually, as indicated by the "each" unit 1222. The child trade item 1208 serves as a parent to the child 1220, and, similarly, the child trade item 1212 serves as a parent to a trade item 1224 that is individually packaged and therefore associated with an each unit 1226. Finally, the trade item 1216 also has a child trade item 1228 packaged as a case 1230.

As can be seen, the trade item packaging hierarchy is generally designed such that a parent trade item may have multiple child trade items, and a child trade item may have multiple parents when it is used in several packaging hierarchies. The relation of the parent trade item to a child trade item carries the quantity of the child trade item at the next lower hierarchy level. Attribute values may depend on the hierarchy level, and each level of the packaging hierarchy may correspond to a certain level specified by EAN.UCC. Maintenance of a single trade items hierarchy may be homogeneously integrated into a maintenance user interface of the trade item.

The trade item relationship of/to a packaging hierarchy may be implemented based on a specified relationship type. The relationship type may be used to offer a flexible and scalable implementation that is based on the individual attributes assignments to the relationship level. Further, the relationship type may be used to obtain a tight integration of the hierarchy maintenance into a user interface for trade item maintenance.

Maintenance of the hierarchy assignment of a trade item may be maintained in combination with the trade item itself. This maintenance may include identification of the trade item via, for example, the GTIN or the Trade Item ID. A tree structure below the single level maintenance may be used to show all levels for each related trade item.

In making changes to a trade item hierarchy, it may be necessary to mark the existing hierarchy as discontinued, and then introduce new trade items and/or hierarchies. This may result from the fact that the trade item hierarchy does not have a time dependency. As such, there may be no reference to a change record of a trade item within the hierarchy; rather, there may be a reference directly to the trade item itself.

Further, a trade item may be part of a hierarchy to which no GTIN is assigned. For example, a trade item may represent a logistical unit (e.g., a pallet), that is not traded as such. In this scenario, the trade information of the pallet in not typically distributed to external data recipients (e.g. data pools or trading partners).

Figure 13A:
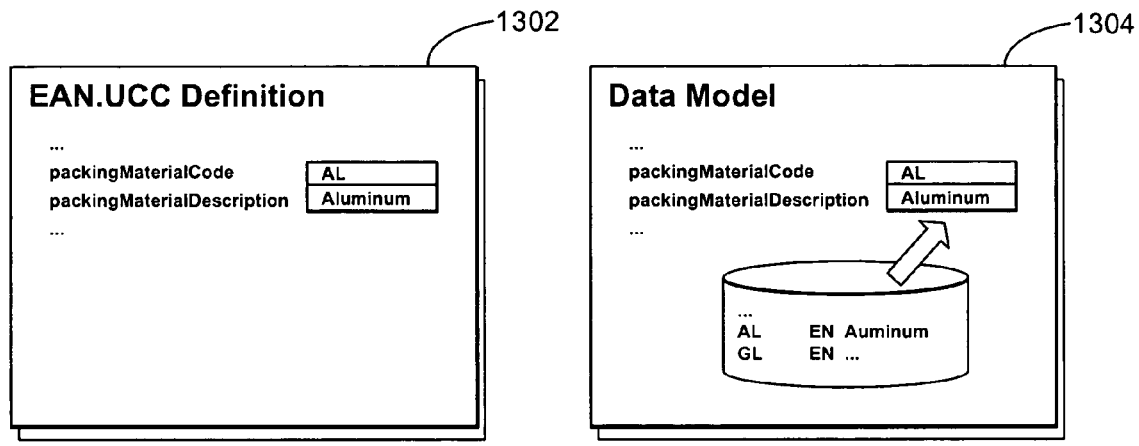
FIGS. 13A-13B are block diagrams illustrating techniques for corresponding EAN.UCC definitions to a data model of the data management system.
Figure 13B:
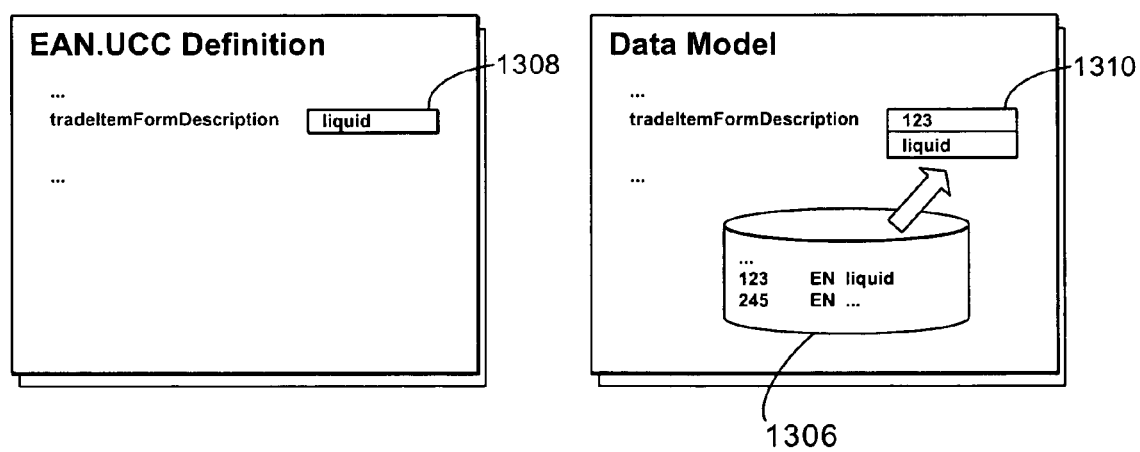

FIGS. 13A-13B are block diagrams illustrating techniques for corresponding EAN.UCC definitions to a data model of the data management system 100. In FIG. 13A, the EAN.UCC definition 1302 corresponds a key attribute (AL) and a description attribute (Aluminum). Because the description attribute may be language-dependent, a user of the data model 1304 may wish to customize the data model 1304 by adding a separate key (GL) within a database 1306, but without storing the description (since the descriptions would typically not be meaningful in the separate language). In FIG. 13B, a freeform text attribute 1308 "liquid" in EAN.UCC is transformed to a numeric expression (key) 1310 in the data model 1306. Such customizations provide techniques for dealing with language-dependency issues, particularly in cases in which there are two corresponding attributes in EAN.UCCC like a key and the description, as just discussed.

When trade item objects as discussed herein are used as part of an outbound process (e.g., sending the trade item objects to the data pool 134), the description is assumed to exist. In an inbound process, however, the message may contain a text value that may require matching to a description of the numeric identifier. If such matching may not feasibly be performed automatically, or does not work for whatever reason, manual intervention may be required. In such cases in particular, then, the customization techniques of FIGS. 13A-13B may be advantageously used.

Figure 14:
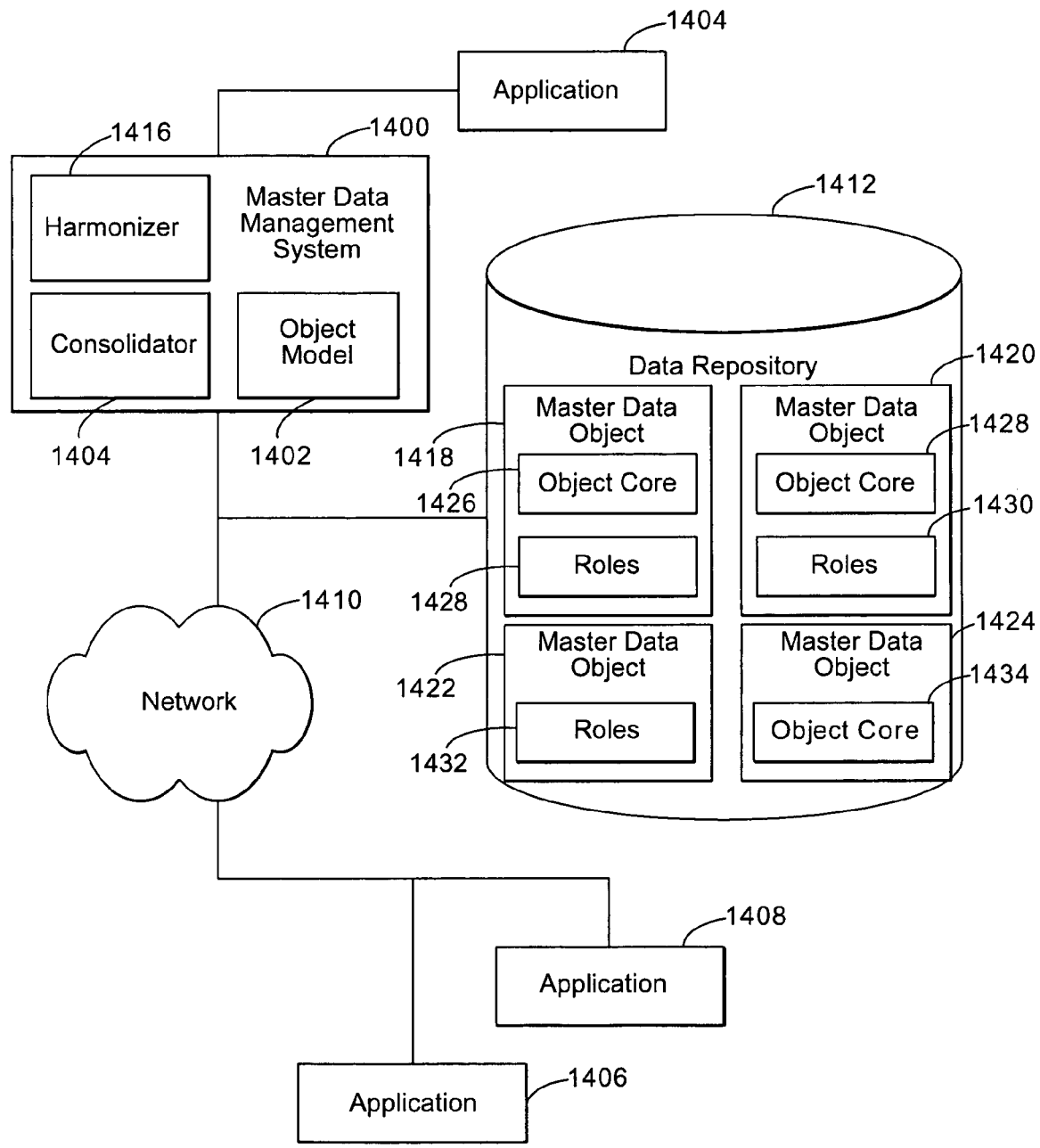
FIG. 14 is a block diagram of a master data management system, providing an implementation of the data management system of FIG. 1.

FIG. 14 is a block diagram of a master data management system 1400, providing an implementation of the data management system 100 of FIG. 1. In FIG. 14, the master data management system 1400 is generally designed to enable companies to consolidate and harmonize product data in a heterogeneous system landscape, and to present a unified face to trading partners who are external to the internal system landscape.

For example, a company may take part in a merger or acquisition in which another company's (different) computer systems must be integrated with existing systems. As another example of a heterogeneous system landscape, it may be the case that different entities or subsidiaries within a larger corporate landscape purchase different systems, or upgrade their respective systems at different times, or in different ways.

As a result, companies may be unable to efficiently track or gather data within their organization. For example, a company may not be able to compare prices from different vendors, since internal users of the vendors may track or report vendor interactions differently from one another. As another example, the company may not be aware that different subsidiaries are using a particular vendor, and may therefore miss an opportunity to negotiate for preferred purchasing terms.

Accordingly, the master data management system 1400 of FIG. 3 may be used for, for example, efficient inventory management, collection of customer data, determination of synergy parts, and streamlined purchasing, as well as many other arenas in which uniform data management may benefit the company as a whole. In short, the master data management system 1400 of FIG. 14 is designed to allow a company or other organization to aggregate, map, exchange, analyze, and disseminate master data, at a business object level and on a global scale, using existing information technology infrastructure.

In providing these features and benefits, the master data management system 1400 includes an object model 1402 that may apply throughout some or all of the system landscape, so that object definitions and dependencies may generally be maintained in a centralized location. It should be understood that the object model 1402 may include object models for both product objects and trade item objects.

In FIG. 14, the master data management system is in communication with applications 1404, 1406, and 1408. Of these the application 1404 represents an internal application that is directly connected to the master data management system 1400, while the application 1406 represents an internal application that is connected with the master data management system 1400 by way of a network 1410, and the application 1408 represents a global trade application which is external to a system landscape of the master data management system 1400. The applications 1404, 1406, and 1408 may be running on different (types or versions of) systems from one another.

In some instances, when one of the applications 1404 or 1406 interacts with the master data management system 1400 (e.g., to upload objects thereto), the specific application may be referred to as a "master data client." Similarly, when the master data management system interacts with one of the applications 1404 or 1406 or their respective systems (e.g., to ensure consistency between objects of the different systems, as discussed in more detail below), the master data management system 1400 may be referred to as a "master data server."

The master data management system 1400 provides a centralized data repository 1412 for data maintenance, and may therefore reduce or eliminate local maintenance by updating client systems running the applications 1404 or 1406 with a copy of master data. As a result, among other benefits, the master data management system 1400 helps an organization ensure a brand identity of its products, and enforce consistent product specifications throughout the organization.

The master data management system 1400 also includes a content consolidator 1414, which is designed to consolidate master data objects from the various different systems. For example, as referred to above with respect to FIG. 1, different subsidiaries or systems within the system landscape may identify products differently from one another, so that it becomes difficult to determine exactly what attributes and data should be associated with a particular product. That is, the repository 1412 may suffer from duplication or omission of such information. The consolidator 1414 conforms the information to the standard of the object model 1402, and may then transfer the consolidated information to the data repository 1412 or other location, for access and use throughout the organization.

A harmonizer 1416 is used to ensure consistency of the data within the objects of the object model 1402, throughout the organization. For example, even if all data within the repository 1412 has been aggregated and consolidated, it may be the case that a user of a particular application 1404 makes a modification to a system running the application 1404 that affects a particular product object. This modification must be reflected throughout, i.e., harmonized with, the other data within the repository 1412.

For example, if a user of the application 1404 indicates that a particular product has been updated, the harmonizer 1416 seeks to ensure that this information is consistent within the repository 1412, or otherwise available throughout the organization, so that other users do not inadvertently use a previous description of the updated product. In other words, the harmonizer 316 is operable to ensure that consolidated master data is harmonized within the system landscape by way of consistent maintenance and distribution of the master data.

As referred to above with respect to FIG. 1, when an organization implements the master data management system 1400, or when a new or modified system is added to the system landscape, the object model 1402 of the master data management system 1400 may be at odds with an object model of the existing, new, or modified system(s). Moreover, even if the object models are similar or interoperable with one another, a size or complexity of the master data management system 1400 (or of the applications 1404, 1406, 1408 accessing the master data management system 1400), may suggest the use of complex or cumbersome objects, and/or of complex or cumbersome interfaces for accessing those objects.

As a result, and in accordance with the features and benefits of the data management system 100 of FIG. 1, trade item objects may be implemented in conjunction with the product objects of the object model 1402. As explained, such trade item objects may be used to minimize the complexity of the associated product objects, and to minimize the information needed by the applications 1404, 1406, and 1408 to interface with desired attributes.

In particular, as shown in FIG. 14, the repository 1412 includes master data product objects 1418 and 1420, and mater data trade item objects 1422 and 1424. The master data product object 1418 includes an object core 1426, which may include, for example, rules governing a persistence of the object 1418. The master data product object 1418 also may include product attributes 1428 that describe or otherwise characterize features and uses of the associated product. Similar comments apply to the master data product object 1420, which includes an object core 1428 and product attributes 1430.

Further, the repository 1412 includes the master data trade item object 1422, which includes trade item attributes 1432, as well as the master data trade item object 1424, which may include trade item attributes 1434. It should be understood from the above description that the trade item attributes, e.g., the trade item attributes 1432 of the master data trade item object 1422, may be derived from the attributes 1428 of an associated master data product object, e.g., the master data product object 1418. That is, the master data trade item object 322 may be related to the master data product object 1418, such that both objects generally correspond, for example, to particular good(s) or service(s) for sale.

Thus, as explained, the master data trade item object 322 may be used for interactions with (global trade) application 1408, while the related (but de-coupled) master data product object 1418 is used for (internal) communication with the applications 1404 and/or 1406. In this way, changes to the objects 1418 and 1422 may be independent of one another, while still being used, for example, for harmonization and consolidation of one another, e.g., by verifying or synchronizing shared attributes.

In FIG. 14, and optionally in FIG. 1, product objects may include attributes that are stored at, and/or define, a database layer of the corresponding data management system. Storing the object attributes at the database layer may imply their persistence in the manner discussed above, as well as a difficulty in modifying the object attributes. In contrast, trade item objects and their attributes need not be stored as database objects, but may be stored as interfaces within a data repository, as dictionary entries that interact with their defined attributes to define contracts for interacting with the applications.

It should be understood from the above discussion of FIG. 1 that components of the master data management system 1400 may be used to create, modify, and use the product objects 1418 and 140, and trade item objects 1422 and 1424, in the manner described above. For example, the harmonizer 1416 and/or consolidator 1414 may be used to assign product object attributes to specific trade item objects, based on, for example, requirements of the application(s) 1404, 1406, and/or 1408 that may ultimately use those attributes.

In this way, the various applications may easily know which product (or trade item) objects to invoke, and how to invoke them, to obtain a desired service or behavior, without requiring knowledge of a corresponding trade item (or product) object associated therewith. Moreover, modifications to a trade item object may be made with respect to (only those) applications that will actually access the trade item object, and without respect to the product object from which the trade item object was derived (or to which the trade item object is related).

Thus, the master data management system 1400 is designed to allow users to access, manage, and manipulate data in a consistent and efficient manner, particularly during global trade scenarios. Existing master data management systems may suffer from many of the shortcomings discussed above, e.g., the need for complex and cumbersome product objects, the possibility of mistakenly modifying data associated with such product objects, a difficulty in accessing product object functionality, and/or a difficulty in modifying an object model. In particular, in the context of the master data management system 1400, it should be understood that, given the goal of the master data management system 1400 to unify data throughout an organization, users may expect universal definition and application of objects within their particular system landscape. Accordingly, the use of product objects and trade item objects in implementing object functionality, relationships, and interfaces, as described herein, may be useful in meeting customer expectations and understanding of "master data" within the context of the master data management system 1400.

Figure 15:
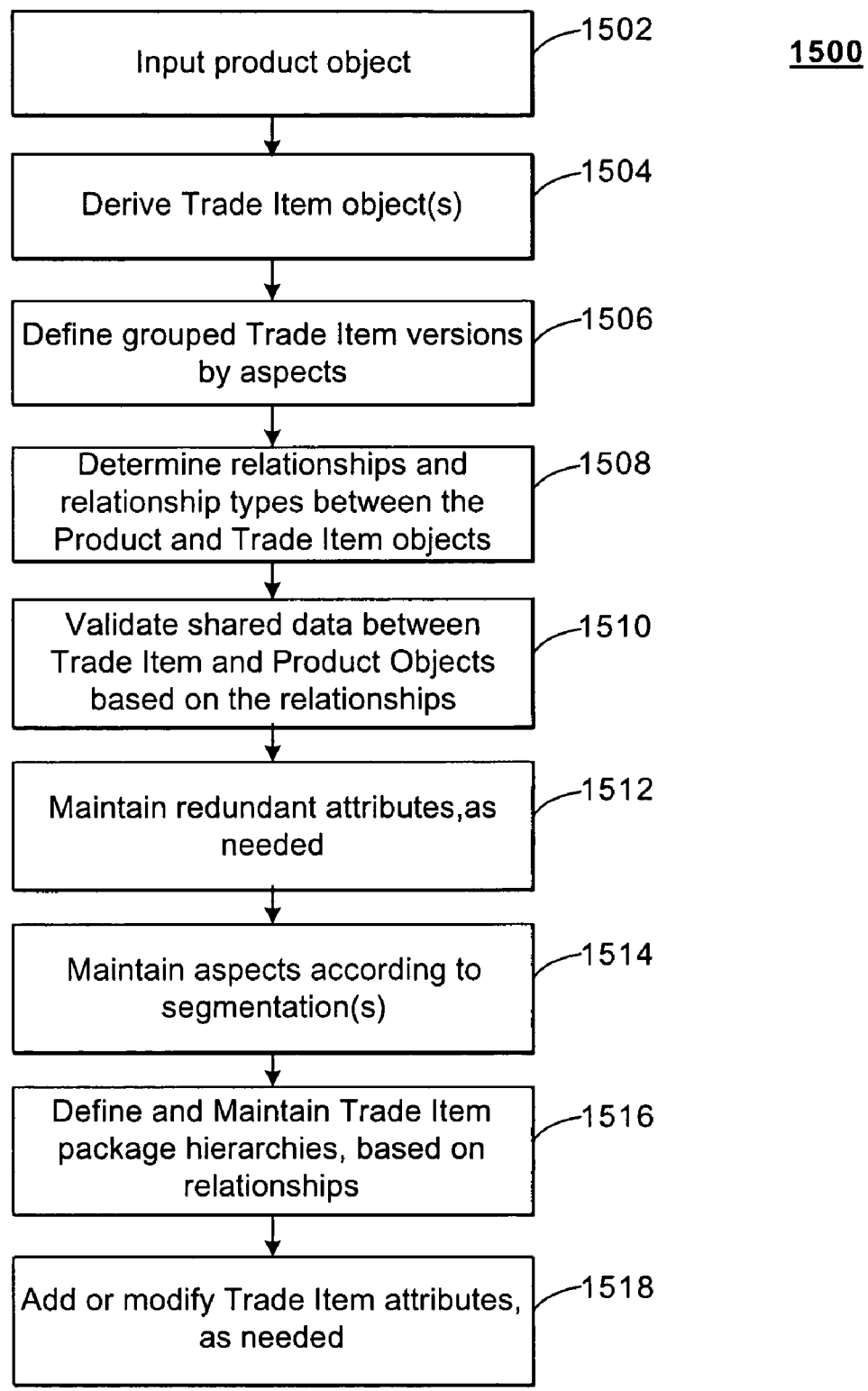
FIG. 15 is a flowchart illustrating an operation of the data management systems of FIGS. 1 and 14.

FIG. 15 is a flowchart illustrating an operation of the data management systems of FIGS. 1 and 14. In FIG. 15, a product object(s) are uploaded from one or more systems (1502), and, if necessary, are aggregated to eliminate inconsistencies between different versions of the product objects. The product objects may then be stored appropriately.

A trade item object is then derived from the aggregated product object, based on attributes of the product object, a relevant global trade standard, and/or an application that will ultimately interface with the trade item object (1504). The attributes of the product and the trade item objects may overlap partially or completely.

The trade item attributes may be grouped as needed to define different aspects of the trade item, so that different versions of the trade item may be created (1506). Relationships between the product object and trade item object(s) may be determined, based on, for example, an extent to which attributes are shared between the two (1508). Then, these relationships may be used to validate shared data between the product and trade item objects (1510). Redundant attributes may thus be maintained, or not, as needed (1512), as described in more detail in, for example, FIG. 8. Somewhat similarly, the aspects may be maintained according to various segmentations (1514). For example, some aspects may be maintained with respect to a particular trading partner or target market.

Trade item package hierarchies may be defined (1516), for example, based on the relationships, so that different hierarchies of the trade item objects may be used in different contexts (e.g., with different trading partners), as needed. Finally, the trade item attributes are modified, augmented, or deleted, as needed (1518), without directly impacting their corresponding product object attributes, if any. In this way, the trade item objects may be kept relatively simple and robust as they provide interfaces to specified global trade applications.

As described above, international operating organizations recognize the benefit of an integrated system landscape and the importance of harmonized data. Thus, an industry wide standard (e.g., the EAN.UCC standard) may be used in alleviating internal data alignment issues, as well as external data synchronization with business partners. However, even in this context, the organizations may struggle with, for example, different releases on their business management systems, inconsistent product data due to duplicates and obsolete records, lack of data synchronization due to lack of system integration, a high number of interfaces requiring various protocols and formats, and existing information technology environments that may be unable to handle the requirements of the relevant industry standard(s).

Accordingly, the data management systems of FIGS. 1 and 3, for example, help to deal with these and other issues, and to open up benefits of the EAN.UCC standard. For example, the described systems provide for alignment of the product data that is to be exchanged via the EAN.UCC standard, optimization of the data quality within the manufacturers system landscape, and setup of the data synchronization with external business partners as a basis for the follow-up business processes (e.g., global trade scenarios). As a result, businesses and other organizations are able to operate more quickly and efficiently, with respect to their own internal processes, as well as with respect to trading with external partners.

A number of implementations have been described. Nevertheless, it will be understood that various modifications may be made. Accordingly, other implementations are within the scope of the following claims.

What is claimed is:

1. A computer-implemented system comprising:
a product aggregator within a data management system that is operable to receive a plurality of product objects that represent abstractions of a product used in trading and that include a plurality of product attributes characterizing the product, the product aggregator further operable to correct automatically inconsistencies among the plurality of product attributes to obtain an aggregated product object and a plurality of aggregated product attributes and store the aggregated product object in a product object database; and
a trade item modifier within a data management system that is operable to:
receive the aggregated product object and the plurality of aggregated product attributes,
derive a trade item object by defining trade item attributes that are determined based on the plurality of aggregated product attributes and on an attribute requirement of an application of a trading partner, and
store the trade item object in a trade item object database.

2. The system of claim 1 comprising a trading interface for interfacing between the trade item object and the application, independently of any communication between the application and the product object.

3. The system of claim 1 wherein the trade item modifier derives the trade item object from the aggregated product object based on a trading standard that is associated with the trading partner.

4. The system of claim 3 wherein the trading standard includes the EAN.UCC standard.

5. The system of claim 1 wherein the product object is used internally within a system landscape of a user of the system to refer to the product, and the trade item object is used to communicate regarding the product with the trading partner or others that are external to the system landscape.

6. The system of claim 1 comprising a product modifier that is operable to modify the aggregated product object, independently of the trade item object.

7. The system of claim 6 wherein the product modifier is operable to modify the aggregated product attributes, without automatically affecting the trade item attributes.

8. The system of claim 1 wherein the trade item modifier is operable to modify the trade item object, independently of the aggregated product object.

9. The system of claim 8 wherein the trade item modifier is operable to modify the trade item attributes, without automatically affecting the aggregated product attributes.

10. The system of claim 1 comprising a relationship manager that is operable to manage relationships between the aggregated product object and the trade item object, based on shared attributes between the two.

11. The system of claim 10 wherein the relationship manager is further operable to check a synchronization of values of the shared attributes, and to initiate a workflow to determine a need for the synchronization when the values are different from one another.

12. The system of claim 1 wherein multiple versions of the trade item object are created, based on groupings of the trade item attributes.

13. The system of claim 1 wherein multiple versions of the trade item object are created, based on differing values of the trade item attributes.

14. The system of claim 13 wherein the differing values of the trade item attributes are dependent on a relationship of the trade item object to the trading partner.

15. The system of claim 13 wherein the differing values of the trade item attributes are dependent on a relationship of the trade item to a target market in which the product is to be sold.

16. The system of claim 1 further comprising a trade item packaging hierarchy system that is operable to define a packaging hierarchy according to which the product is grouped with other products for sale, shipment, or display.

17. The system of claim 1 wherein the system includes a master data management system that is operable to provide an object model that includes the plurality of product objects and a plurality of trade item objects and that enables a common use of the plurality of product objects within a system landscape of a user of the master data management system.

18. The system of claim 17 wherein the master data management system comprises:
a content consolidator that is operable to consolidate the plurality of product objects uploaded from systems or applications within the system landscape; and
a harmonizer that is operable to ensure consistency of data within the plurality of product objects or the plurality of trade item objects, throughout the systems or applications.

19. A method comprising:
receiving a plurality of product objects, at a server, that represent abstractions of a product for sale, the plurality of product objects including a plurality of product attributes;
automatically aggregating the plurality of product objects at the server to correct inconsistencies among the plurality of product attributes to obtain an aggregated product object and a plurality of aggregated product attributes;
accessing a trade standard governing information exchanges with a trading partner; and
deriving a trade item object from the plurality of aggregated product attributes at the server, based on the trade standard and an attribute requirement of an application used by the trading partner.

20. The method of claim 19 comprising:
using the aggregated product object to reference the product throughout an internal system landscape; and using the trade item object to reference the product in communication with the application and external to the system landscape.

21. The method of claim 19 comprising providing access to the trade item object by the application, independently of a communication between the aggregated product object and the application.

22. The method of claim 19 wherein deriving the trade item object comprises determining trade item attributes from the plurality of aggregated product object attributes, for inclusion within the trade item object.

23. The method of claim 22 comprising creating multiple versions of the trade item object, based on groupings of the attributes.

24. The method of claim 22 comprising creating multiple versions of the trade item object, based on values of the attributes.

25. The method of claim 22 comprising creating multiple versions of the trade item object, based on relationships between the trade item object and the trading partner.

26. The method of claim 22 comprising creating multiple versions of the trade item object, based on relationships between the trade item object and a target market of the product.

27. The method of claim 22 comprising validating values of the plurality of aggregated product object attributes against values of shared trade item attributes.

28. The method of claim 19 comprising modifying the aggregated product object and the trade item object independently of one another.

29. The method of claim 19 wherein deriving the trade item object comprises creating a packaging hierarchy that defines the trade item in terms of a packaging of the product for sale, shipment, or delivery.

30. An apparatus comprising a non-transitory computer-readable storage medium having instructions stored thereon, the instructions being executed by a processor of the apparatus, and the instructions including:

a first code segment for maintaining a plurality of product objects representing abstractions of a product for sale and a plurality of product attributes characterizing the product for sale;

a second code segment for automatically correcting one or more inconsistencies to change data among the plurality of product attributes;

a third code segment for maintaining a plurality of trade item objects derived from the plurality of product objects based on a trading standard, the plurality of trade item objects including a plurality of trade item attributes derived from the plurality of product attributes;

a fourth code segment for maintaining the plurality of product objects and the plurality of trade item objects such that use of one of the plurality of product objects within an internal system landscape of an organization is independent of use of its derived trade item object externally of the system landscape;

a fifth code segment for consolidating the plurality of product objects to generate consolidated information that conforms to an object model;

a sixth code segment for transferring the consolidated information to a data repository; and a seventh code segment for ensuring consistency of data within the plurality of product objects based on the consolidated information in the data repository.

31. The apparatus of claim 30 comprising an eighth code segment for using the trade item object externally of the system landscape by interfacing with an application of a trading partner through the trade item object.

32. The apparatus of claim 31 wherein the second code segment includes a ninth code segment for deriving the trade item attributes from the product attributes, based on requirements of the application.

33. The apparatus of claim 30 comprising an eighth code segment for validating the trade item attributes against the product object attributes.

* * * * *